US008795568B2

(12) United States Patent
Trpkovski

(10) Patent No.: US 8,795,568 B2
(45) Date of Patent: Aug. 5, 2014

(54) METHOD OF MAKING A BOX SPACER WITH SIDEWALLS

(75) Inventor: Paul Trpkovski, Buffalo, WY (US)

(73) Assignee: Guardian IG, LLC, Sun Prairie, WI (US)

( * ) Notice: Subject to any disclaimer, the term of this patent is extended or adjusted under 35 U.S.C. 154(b) by 0 days.

(21) Appl. No.: 13/424,088

(22) Filed: Mar. 19, 2012

(65) Prior Publication Data

US 2012/0177827 A1 Jul. 12, 2012

Related U.S. Application Data

(62) Division of application No. 12/270,315, filed on Nov. 13, 2008, now Pat. No. 8,151,542.

(60) Provisional application No. 61/038,803, filed on Mar. 24, 2008, provisional application No. 61/049,599, filed on May 1, 2008, provisional application No. 61/049,593, filed on May 1, 2008, provisional application No. 60/987,681, filed on Nov. 13, 2007.

(51) Int. Cl.
*B29C 47/02* (2006.01)

(52) U.S. Cl.
USPC ............ 264/261; 264/251; 264/252; 264/254

(58) Field of Classification Search
None
See application file for complete search history.

(56) References Cited

U.S. PATENT DOCUMENTS

| | | | | |
|---|---|---|---|---|
| 32,436 | A | 5/1861 | Scofield | |
| 367,236 | A | 7/1887 | Eeinhaedt | |
| 423,704 | A | 3/1890 | Simpson | |
| 1,310,206 | A | 7/1919 | Mowat | |
| 1,425,207 | A | 8/1922 | Milner | |
| 2,235,680 | A | 3/1941 | Haven et al. | |
| 2,275,812 | A * | 3/1942 | Woelfel | 264/261 |
| 2,507,097 | A | 5/1950 | Fields | |
| 2,597,097 | A | 5/1952 | Haven | |
| 2,618,819 | A | 11/1952 | Goodwille | |
| 2,708,774 | A | 5/1955 | Seelen | |
| 2,885,746 | A | 5/1956 | Güra | |
| 2,833,031 | A | 5/1958 | Flumerfelt | |
| 2,838,810 | A | 6/1958 | Englehart et al. | |

(Continued)

FOREIGN PATENT DOCUMENTS

| | | |
|---|---|---|
| AT | 379 860 | 3/1986 |
| AT | 379860 | 3/1986 |

(Continued)

OTHER PUBLICATIONS

"Chinese Final Office Action", for Chinese Application No. 200880115633.X, corresponding to U.S. Appl. No. 12/270,315, mailed Sep. 5, 2012, including English translation, (17 pages).

(Continued)

*Primary Examiner* — Edmund H. Lee

(74) *Attorney, Agent, or Firm* — Remarck Law Group PLC

(57) ABSTRACT

The technology disclosed herein generally relates to methods of making a spacer. At least a portion of a first elongate strip and a portion of a second elongate strip are arranged to define a space there between. A first sidewall is extruded through a first extrusion nozzle in the space. The first sidewall is adhered to the first elongate strip and the second elongate strip and the first extrusion nozzle is moved relative to the first and second elongate strips while extruding the first sidewall.

12 Claims, 18 Drawing Sheets

(56) References Cited

U.S. PATENT DOCUMENTS 3,027,608 A 4/1962 Ryan
3,045,297 A 7/1962 Ljungdahl
3,143,009 A 8/1964 Pfeiffer
3,280,523 A 10/1966 Stroud et al.
3,288,667 A 11/1966 Martin
3,367,161 A 2/1968 Avakian
3,645,121 A 2/1972 Pfeiffer et al.
3,756,060 A 9/1973 Bindernagel
3,758,996 A 9/1973 Bowser
3,796,080 A 3/1974 Munchbach
3,839,137 A 10/1974 Davis et al.
3,921,359 A 11/1975 Brichard et al.
3,935,893 A 2/1976 Stang et al.
3,956,998 A 5/1976 Bavetz
3,971,243 A 7/1976 Jones
3,974,011 A * 8/1976 Jarchow et al. ............... 156/107
3,981,111 A 9/1976 Berthagen
4,002,048 A 1/1977 Pozsgay
4,027,517 A 6/1977 Bodnar
4,057,944 A 11/1977 Wyatt et al.
4,057,945 A 11/1977 Kessler
4,074,480 A 2/1978 Burton
4,080,482 A 3/1978 Lacombe
4,098,722 A 7/1978 Cairns et al.
4,113,799 A 9/1978 Van Ornum et al.
4,113,904 A 9/1978 Kiefer
4,113,905 A 9/1978 Kessler
4,114,342 A 9/1978 Okawa
4,145,237 A * 3/1979 Mercier et al. ................ 156/107
4,222,213 A 9/1980 Kessler
4,226,063 A 10/1980 Chenel
4,233,833 A 11/1980 Balinski
4,241,146 A 12/1980 Sivachenko et al.
4,244,203 A 1/1981 Pryor et al.
4,382,375 A 5/1983 Yamamoto et al.
4,400,338 A 8/1983 Rundo
4,406,726 A 9/1983 Lisec
4,408,474 A 10/1983 Hutzenlaub et al.
4,431,691 A 2/1984 Greenlee
4,434,024 A 2/1984 Lisec
4,494,283 A 1/1985 Lisec
4,495,023 A 1/1985 Lisec
4,499,703 A 2/1985 Rundo
4,536,424 A 8/1985 Laurent
4,551,364 A 11/1985 Davies
4,561,929 A 12/1985 Lenhardt
4,567,710 A 2/1986 Reed
4,576,841 A 3/1986 Lingemann
4,580,428 A 4/1986 Brettbacher et al.
4,654,057 A 3/1987 Rhodes
4,658,553 A 4/1987 Shinagawa
4,711,692 A 12/1987 Lisec
4,716,686 A 1/1988 Lisec
4,719,728 A 1/1988 Eriksson et al.
4,720,950 A 1/1988 Bayer et al.
4,726,875 A * 2/1988 Lenhardt ...................... 156/538
4,743,336 A 5/1988 White
4,753,096 A 6/1988 Wallis
4,762,743 A 8/1988 von Alven et al.
4,769,105 A 9/1988 Lisec
4,780,164 A 10/1988 Rueckheim et al.
4,791,773 A 12/1988 Taylor
4,803,775 A 2/1989 Lisec
4,808,452 A 2/1989 McShane
4,815,245 A 3/1989 Gartner
4,831,799 A 5/1989 Glover et al.
4,835,130 A 5/1989 Box
4,835,926 A 6/1989 King
4,836,005 A 6/1989 Lisec
4,850,175 A 7/1989 Berdan
4,854,022 A 8/1989 Lisec
4,862,666 A 9/1989 Kero
4,866,967 A 9/1989 Sporenberg et al.
4,881,355 A 11/1989 Bosl et al.
4,885,926 A 12/1989 Lisec
4,886,095 A 12/1989 Lisec
4,886,410 A 12/1989 Lisec
4,902,213 A * 2/1990 Lisec ............................ 425/113
4,921,022 A 5/1990 Lisec
4,929,814 A 5/1990 Lisec
4,949,666 A 8/1990 Lisec
4,961,816 A 10/1990 Lisec
4,973,436 A 11/1990 Lisec
5,052,164 A 10/1991 Sandow
5,079,054 A 1/1992 Davies
5,080,146 A 1/1992 Arasteh
5,087,489 A 2/1992 Lingemann
5,088,258 A 2/1992 Schield et al.
5,113,678 A 5/1992 Mannaka et al.
5,120,584 A 6/1992 Ohlenforst et al.
5,167,756 A 12/1992 Lenhardt
5,182,931 A 2/1993 Noe et al.
5,209,034 A 5/1993 Box et al.
5,254,377 A 10/1993 Lingemann
5,280,832 A 1/1994 Lisec
5,290,611 A 3/1994 Taylor
5,295,292 A 3/1994 Leopold
5,302,425 A 4/1994 Taylor
5,308,662 A 5/1994 Woodard et al.
5,313,762 A 5/1994 Guillemet
5,361,476 A 11/1994 Leopold
5,377,473 A 1/1995 Narayan et al.
5,390,406 A 2/1995 Lisec
5,391,416 A 2/1995 Kunert
5,394,671 A 3/1995 Taylor
5,394,725 A 3/1995 Lisec
5,413,156 A 5/1995 Lisec
5,439,716 A 8/1995 Larsen
5,441,779 A 8/1995 Lafond
5,443,871 A 8/1995 Lafond
5,461,840 A 10/1995 Taylor
5,485,709 A 1/1996 Guillemet
5,512,341 A 4/1996 Newby et al.
5,514,428 A 5/1996 Kunert
5,531,047 A 7/1996 Leopold et al.
5,553,440 A 9/1996 Bulger et al.
5,564,631 A 10/1996 Leopold
5,567,258 A 10/1996 Lee et al.
5,568,714 A 10/1996 Peterson
5,573,618 A 11/1996 Rueckheim
5,581,971 A 12/1996 Peterson
5,601,677 A 2/1997 Leopold
5,617,699 A 4/1997 Thompson
5,626,712 A 5/1997 Lisec
5,630,306 A 5/1997 Wylie
5,644,894 A 7/1997 Hudson
5,655,282 A 8/1997 Hodek et al.
5,658,645 A 8/1997 Lafond
5,675,944 A 10/1997 Kerr et al.
5,679,419 A 10/1997 Larsen
5,705,010 A 1/1998 Larsen
5,714,214 A 2/1998 Larsen
5,759,665 A 6/1998 Lafond
5,773,135 A 6/1998 Lafond
5,775,393 A 7/1998 Kovacik
5,813,191 A 9/1998 Gallagher
5,851,609 A 12/1998 Baratuci et al.
5,855,132 A 1/1999 Cozzi
5,873,256 A 2/1999 Denniston
5,879,764 A 3/1999 Chu et al.
5,890,289 A 4/1999 Guillemet
5,980,666 A * 11/1999 Roth et al. .................... 156/107
6,035,602 A 3/2000 Lafond
6,038,825 A 3/2000 Shah et al.
6,079,242 A 6/2000 Allegro et al.
6,092,375 A 7/2000 Denni
6,109,084 A 8/2000 Hutzenlaub et al.
6,115,989 A 9/2000 Boone et al.
6,131,364 A 10/2000 Peterson
6,148,890 A 11/2000 LaFond
6,183,879 B1 2/2001 Deeley
6,197,129 B1 3/2001 Zhu et al.
6,223,414 B1 5/2001 Hodek et al.
6,238,755 B1 * 5/2001 Harvey et al. ................... 428/34

(56) References Cited

U.S. PATENT DOCUMENTS

| | | | |
|---|---|---|---|
| 6,250,026 | B1 | 6/2001 | Thompson, Jr. |
| 6,266,940 | B1 | 7/2001 | Reichert |
| 6,289,641 | B1 | 9/2001 | McCandless |
| 6,295,788 | B2 | 10/2001 | Reichert |
| 6,345,485 | B1 | 2/2002 | Boone et al. |
| 6,355,328 | B1 | 3/2002 | Baratuci et al. |
| 6,370,838 | B1 | 4/2002 | Evason et al. |
| 6,415,561 | B2 | 7/2002 | Thompson, Jr. |
| 6,477,812 | B2 | 11/2002 | Boone et al. |
| 6,481,222 | B1 | 11/2002 | Denniston |
| 6,488,996 | B1 | 12/2002 | Ino et al. |
| 6,497,130 | B2 | 12/2002 | Nilsson |
| 6,500,516 | B2 | 12/2002 | Bourlier |
| 6,528,131 | B1 | 3/2003 | Lafond |
| 6,581,341 | B1 | 6/2003 | Baratuci |
| 6,622,456 | B2 | 9/2003 | Almasy |
| 6,686,002 | B2 | 2/2004 | Auerbach |
| 6,715,244 | B2 | 4/2004 | Boone et al. |
| 6,796,102 | B2 | 9/2004 | Virnelson et al. |
| 6,823,644 | B1 | 11/2004 | Peterson |
| 6,877,292 | B2 | 4/2005 | Baratuci et al. |
| 6,887,292 | B2 | 5/2005 | Thorwesten |
| 6,911,103 | B2 * | 6/2005 | Koizumi et al. .............. 156/109 |
| 7,008,492 | B2 | 3/2006 | Lisec |
| 7,043,881 | B2 | 5/2006 | Krause, Sr. et al. |
| 7,107,729 | B2 | 9/2006 | Baratuci et al. |
| 7,132,151 | B2 | 11/2006 | Rasmussen |
| 7,347,909 | B2 | 3/2008 | Reichert |
| 7,445,682 | B2 | 11/2008 | James et al. |
| 7,448,246 | B2 | 11/2008 | Briese et al. |
| 7,563,739 | B2 | 7/2009 | Kilthau et al. |
| 7,827,761 | B2 | 11/2010 | Buchanan et al. |
| 7,856,791 | B2 | 12/2010 | Rosskamp et al. |
| 8,025,941 | B2 | 9/2011 | Taylor et al. |
| 8,114,488 | B2 | 2/2012 | Alvarez |
| 8,151,542 | B2 | 4/2012 | Trpkovski |
| 8,181,499 | B2 | 5/2012 | Ingvarsson |
| 8,586,193 | B2 | 11/2013 | Rapp et al. |
| 2001/0015037 | A1 | 8/2001 | Thompson |
| 2001/0032436 | A1 | 10/2001 | Riegelman |
| 2003/0041557 | A1 | 3/2003 | Trpkovski et al. |
| 2003/0074859 | A1 | 4/2003 | Reichert et al. |
| 2003/0097818 | A1 | 5/2003 | Almasy |
| 2003/0101664 | A1 | 6/2003 | Trpkovski |
| 2003/0178127 | A1 | 9/2003 | Lisec |
| 2003/0230045 | A1 | 12/2003 | Krause |
| 2005/0055901 | A1 | 3/2005 | Valentz et al. |
| 2005/0074566 | A1 | 4/2005 | Rouanet |
| 2005/0166546 | A1 | 8/2005 | Reichert |
| 2005/0167028 | A1 | 8/2005 | Reichert |
| 2005/0178078 | A1 | 8/2005 | Valentz et al. |
| 2005/0227025 | A1 | 10/2005 | Baratuci et al. |
| 2006/0065345 | A1 | 3/2006 | James et al. |
| 2006/0101739 | A1 | 5/2006 | Baratuci et al. |
| 2006/0105158 | A1 | 5/2006 | Fritz et al. |
| 2006/0130427 | A1 | 6/2006 | Hodek et al. |
| 2006/0201606 | A1 | 9/2006 | Lisec |
| 2007/0077376 | A1 | 4/2007 | Mamiya et al. |
| 2007/0087140 | A1 | 4/2007 | Dierks |
| 2007/0116907 | A1 | 5/2007 | Landon et al. |
| 2007/0131338 | A1 | 6/2007 | Lisec |
| 2007/0160781 | A1 | 7/2007 | Landon et al. |
| 2007/0178256 | A1 | 8/2007 | Landon |
| 2007/0178257 | A1 | 8/2007 | Landon |
| 2008/0060290 | A1 | 3/2008 | McGlinchy et al. |
| 2009/0120018 | A1 | 5/2009 | Trpkovski |
| 2009/0120019 | A1 | 5/2009 | Trpkovski |
| 2009/0120035 | A1 | 5/2009 | Trpkovski |
| 2009/0120036 | A1 | 5/2009 | Trpkovski |
| 2009/0123694 | A1 | 5/2009 | Trpkovski |
| 2009/0223150 | A1 | 9/2009 | Baratuci et al. |
| 2009/0301637 | A1 | 12/2009 | Reichert |
| 2010/0065580 | A1 | 3/2010 | McGlinchy et al. |
| 2010/0200164 | A1 | 8/2010 | Lisec |
| 2010/0255224 | A1 | 10/2010 | Gubbels et al. |
| 2011/0104512 | A1 | 5/2011 | Rapp et al. |
| 2011/0303349 | A1 | 12/2011 | Nieminen et al. |
| 2012/0151857 | A1 | 6/2012 | Heikkila et al. |
| 2012/0177827 | A1 | 7/2012 | Trpkovski |
| 2013/0042552 | A1 | 2/2013 | Trpkovski et al. |
| 2013/0047404 | A1 | 2/2013 | Nieminen et al. |

FOREIGN PATENT DOCUMENTS

| | | | |
|---|---|---|---|
| CA | 1260624 | | 12/1986 |
| CA | 1290624 | | 10/1991 |
| CA | 2757945 | | 10/2010 |
| CH | 630993 | | 7/1982 |
| DE | 1 259 823 | | 2/1968 |
| DE | 69 03 785 | U | 1/1969 |
| DE | 1189518 | | 4/1970 |
| DE | 1 904 907 | | 8/1970 |
| DE | 1904907 | | 6/1971 |
| DE | 2152071 | | 2/1973 |
| DE | 3529434 | | 2/1986 |
| DE | 3529403 | * | 4/1986 |
| DE | 41 01 277 | | 7/1992 |
| DE | 196 42 669 | C1 | 3/1998 |
| DE | 100111759 | | 9/2001 |
| DE | 202 00 349 | U1 | 5/2003 |
| EP | 54251 | | 6/1982 |
| EP | 0107493 | | 5/1984 |
| EP | 0128981 | | 12/1984 |
| EP | 0 139 262 | | 5/1985 |
| EP | 0 268 886 | | 6/1988 |
| EP | 0324488 | | 7/1989 |
| EP | 0 403 058 | | 12/1990 |
| EP | 0 500 483 | | 8/1992 |
| EP | 1320422 | | 2/2006 |
| EP | 2177703 | | 4/2010 |
| FR | 2 276 450 | | 1/1976 |
| FR | 2 525 314 | | 10/1983 |
| FR | 2 744 165 | | 8/1997 |
| FR | 2744165 | | 8/1997 |
| GB | 1 579 726 | | 11/1980 |
| GB | 2 181 773 | | 4/1987 |
| GB | 2 389 138 | | 12/2003 |
| JP | S38-4432 | | 2/1963 |
| WO | WO-03074830 | | 9/2003 |
| WO | WO-03101709 | | 12/2003 |
| WO | WO-2004009944 | | 1/2004 |
| WO | WO-2005054617 | | 6/2005 |
| WO | WO-2009064905 | A1 | 5/2009 |
| WO | WO-2009064909 | A1 | 5/2009 |
| WO | WO-2009064915 | A1 | 5/2009 |
| WO | WO-2009064919 | A1 | 5/2009 |
| WO | WO-2009064921 | A1 | 5/2009 |
| WO | WO-2010094446 | | 8/2010 |
| WO | WO-2011008860 | A1 | 1/2011 |
| WO | WO-2011156722 | A1 | 12/2011 |
| WO | WO-2012083156 | | 6/2012 |

OTHER PUBLICATIONS

"Communication Pursuant to Rules 161(1) and 162 EPC", in co-pending Application PCT/US2010/041978 dated Mar. 7, 2012, (2 pages).

"Decision to Grant", for Chinese Application No. 200880115858.5, mailed Jun. 27, 2012, (4 pages).

"File History", for U.S. Appl. No. 12/270,362 from Nov. 13, 2008 through Oct. 28, 2011, entitled "Sealed Unit and Spacer with Stabilized Elongate Strip", (197 pages).

"File History", for co-pending U.S. Appl. No. 12/836,350 from Jul. 14, 2010 through Jun. 27, 2012 , entitled "Stretched Strips for Spacer and Sealed Unit", (546 pages ).

"Insulating Glass Production", Author Unknown, Glass Digest, vol. 73, No. 5, May 15, 1994, (4 pages).

"International Search Report and Written Opinion", in co-pending Application PCT/US2011/065470, mailed May 7, 2012, (11 pages).

"Making Windows More Exciting", Author Unknown, Allmetal Product Catalog, (2 pages).

"Non-Final Office Action", mailed Jul. 17, 2012 in U.S. Appl. No. 12/270,215, "Sealed Unit and Spacer" (31 pages).

(56) References Cited

OTHER PUBLICATIONS

"Notice of Allowance", from Russia Application No. 2010123824, received Oct. 15, 2012, (9 pages).
"Notice of Publication", dated Dec. 15, 2011 for co-owned, co-pending, International Application No. PCT/US2011/30994, 1 page.
"Notice of Publication", dated Jun. 21, 2012 for co-owned, co-pending, International Application No. PCT/US2011/065470, corresponding to U.S. Appl. No. 13/326,501 1 page.
"Edgetech I.G., Super Spacer® Cushion Edge™, Decorative Glass, Foam Space . . . ", http://www.edgetechig.com/SuperSpacer/CushionEdge.aspx May 23, 2011, 1 page.
International Search Report and Written Opinion mailed Feb. 11, 2009, International Application No. PCT/US2010/083445, corresponding to U.S. Appl. No. 12/270,315 (16 pages).
International Search Report and Written Opinion mailed Jan. 22, 2009, International Application No. PCT/US2010/083428, corresponding to U.S. Appl. No. 12/270,215 (13 pages).
International Search Report and Written Opinion mailed Jan. 22, 2009, International Application No. PCT/US2010/083441, corresponding to U.S. Appl. No. 12/270,289 (15 pages).
International Search Report and Written Opinion mailed Jan. 22, 2009, International Application No. PCT/US2010/083449, corresponding to U.S. Appl. No. 12/270,362 (13 pages).
International Search Report and Written Opinion mailed Jan. 22, 2009, International Application No. PCT/US2010/083435, corresponding to U.S. Appl. No. 12/270,393 (12 pages).
International Search Report and Written Opinion mailed Nov. 2, 2010, International Application No. PCT/US2010/041978, corresponding to U.S. Appl. No. 12/836,350 (12 pages).
"Replacement Window Spacers: The Swiggle Spacer System, http://www.replacement-windows.com/spacers-swiggle-system.php" (downloaded from web site Oct. 10, 2011).
"Chinese Office Action Received", for Chinese Application No. 200880115633.X, corresponding to U.S. Appl. No. 12/270,315, mailed Jan. 5, 2012, (pp. 23) Including English translation, 23.
"File History of Office Actions and Office Action Responses", for co-pending, co-owned U.S. Appl. No. 12/270,215 as of Mar. 19, 2012, Entitled "Sealed Unit and Spacer," filed Nov. 13, 2008 (211 pages).
"File History of Office Actions and Office Action Responses", for co-pending, co-owned U.S. Appl. No. 12/270,289 as of Mar. 19, 2012, Entitled "Reinforced Window Spacer," filed Nov. 13, 2008 (84 pages).
"File History of Office Actions and Office Action Responses", for co-pending, co-owned U.S. Appl. No. 12/270,315 as of Mar. 19, 2012, Entitled "Box Spacer with Sidewalls," filed Nov. 13, 2008 (154 pages).
"File History of Office Actions and Office Action Responses", for co-pending, co-owned U.S. Appl. No. 12/270,393 as of Mar. 19, 2012, Entitled "Material with Undulating Shape," filed Nov. 13, 2008 (30 pages).
"First Office Action Received", for Chinese Application No. 200880115858.5, corresponding to U.S. Appl. No. 12/270,215, mailed Dec. 12, 2011, (pp. 17).
"Intercept® Spacer Technologies: Your Best Answer to Energy Star® and EN-1279, GED Integrated Solutions,", http://www.gedusa.com/intercept.php (Jun. 28, 2011 9:08:36 AM), 2 pages.
"PCT International Search Report and Written Opinion from International", PCT International Search Report and Written Opinion from International Application No. PCT/US11/39994, corresponding to U.S. Appl. No. 60/987,681, mailed Nov. 17, 2011 pp. 1-15.
"PCT Notification Concerning Transmittal of International Preliminary Report on Patentability", Application No. PCTUS2010041978, corresponding to U.S. Appl. No. 12/836,350, mailed Jan. 26, 2012, pp. 1-6.
"Description and Photos of Allmetal Spacers sold in 1990's", Four spacers made and offered for sale by Allmetal, Inc. of Itasca, Illinois in the 1990s., pp. 1-3.
"File History of Office Actions and Office Action Responses", for co-pending, co-owned U.S. Appl. No. 12/270,215 from Mar. 19, 2012 thru Apr. 14, 2013, Entitled "Sealed Unit and Spacer," filed Nov. 13, 2008 (190 pages).
"Final Office Action", mailed Jan. 18, 2013, in co-pending U.S. Appl. No. 12/836,350, "Stretched Strips for Spacer and Sealed Unit," (16 pages).
"Office Action", for Mexico Application No. MX/a/2010/005259, mailed Feb. 22, 2013 (4 pages).
"Office Action", for Mexico Application No. MX/a/2010/005260, mailed Feb. 22, 2013 (7 pages).
"PCT Notification Concerning Transmittal of International Preliminary Report on Patentability", from International Application No. PCT/US2008/083428, corresponding to U.S. Appl. No. 12/270,215 mailed May 18, 2010, pp. 7.
"PCT Notification Concerning Transmittal of International Preliminary Report on Patentability", from International Application No. PCT/US2008/083435, corresponding to U.S. Appl. No. 12/270,393, mailed May 18, 2010, pp. 1-6.
"PCT Notification Concerning Transmittal of International Preliminary Report on Patentability", from International Application No. PCT/US2008/083441, corresponding to U.S. Appl. No. 12/270,289, mailed Jan. 12, 2010, pp. 1-8.
"PCT Notification Concerning Transmittal of International Preliminary Report on Patentability", from International Application No. PCT/US2008/083449, corresponding to U.S. Appl. No. 12/270,362, mailed May 18, 2010, pp. 1-7.
"PCT Notification Concerning Transmittal of International Preliminary Report on Patentability", from International Application No. PCT/US2008/083445, corresponding to U.S. Appl. No. 12/270,315, mailed May 18, 2010, pp. 1-9.
"PCT Notification Concerning Transmittal of International Preliminary Report on Patentability", from International Application No. PCTIUS2011/039994, corresponding to, mailed Dec. 20, 2012, pp. 1-10.
English abstract and figures for patent document EP-291499, published Nov. 17, 1988, inventor Lisec, Peter.
"Office Action", from MX Application No. MX/a/2010/005260, mailed Jul. 4, 2013, 4 pages.
"Office Action Translation", from JP Application No. 2010-534184, mailed Aug. 13, 2013 (2 pages).
"Final Office Action Translation", from JP Application No. 2010-534186, mailed Nov. 26, 2013 (3 pages).
"JP-2008037662 Translated Abstract and Figures", Published Feb. 21, 2008, Eiji Uno et al. (3 pages).
"Office Action (Translation)", from JP Application No. 2010-534186, mailed Jul. 11, 2013, 2 pages.
English Abstract and Figures from JP Publication No. 09-272848, Entitled "Cold-Curing Moisture-Absorbing Adhesive Tape for Double Glazing and Double Glazing Produced by Using the Tape" Inventor, Mitsuhashi Kimiyuki, filed Apr. 8, 1996 (3 pages).
English Abstract and Figures from JP Publication No. 2007-277052, Entitled "Spacer for Multiple Glass, Multiple Glass and Method of Manufacturing Spacer for Multiple Glass" Inventor, Kodera Shogo et al., filed Apr. 7, 2006 (4 pages).

* cited by examiner

METHOD OF MAKING A BOX SPACER WITH SIDEWALLS

RELATED APPLICATIONS

This application claims priority to U.S. Provisional Application No. 60/987,681, filed on Nov. 13, 2007, titled "WINDOW ASSEMBLY AND WINDOW SPACER"; and to U.S. Provisional Application No. 61/049,593, filed on May 1, 2008, titled "WINDOW ASSEMBLY AND WINDOW SPACER"; and to U.S. Provisional Application No. 61/049,599, filed on May 1, 2008, titled "MANUFACTURE OF WINDOW ASSEMBLY AND WINDOW SPACER"; and to U.S. Provisional Application No. 61/038,803, filed on Mar. 24, 2008, titled "WINDOW ASSEMBLY AND WINDOW SPACER"; and to U.S. application Ser. No. 12/270,315, filed on Nov. 13, 2008, now U.S. Pat. No. 8,151,542, titled, "BOX SPACER WITH SIDEWALLS"; the disclosures of which are each hereby incorporated by reference in their entirety.

BACKGROUND

Windows often include two facing sheets of glass separated by an air space. The air space reduces heat transfer through the window to insulate the interior of a building to which it is attached from external temperature variations. As a result, the energy efficiency of the building is improved, and a more even temperature distribution is achieved within the building.

SUMMARY

In one embodiment the technology disclosed herein generally relates to methods of making a spacer. At least a portion of a first elongate strip and a portion of a second elongate strip are arranged to define a space there between. A first sidewall is extruded through a first extrusion nozzle in the space. The first sidewall is adhered to the first elongate strip and the second elongate strip and the first extrusion nozzle is moved relative to the first and second elongate strips while extruding the first sidewall.

In another embodiment, a method of making a spacer is taught where at least a portion of a first elongate strip and a portion of a second elongate strip are positioned in a spaced relationship, where the first elongate strip has a first surface and the second elongate strip has a second surface. A first sidewall is extruded through a first extrusion nozzle; and the first extrusion nozzle is moved relative to the first and second elongate strips while extruding to apply the first sidewall to the first surface of the first elongate strip and to the second surface of the second elongate strip to connect the first and second elongate strips.

In general terms, this disclosure is also directed to a window assembly and a window spacer. In one possible configuration and by non-limiting example, the window assembly includes a first sheet, a second sheet, and a spacer arranged between the first sheet and the second sheet. The spacer includes a first elongate strip, a second elongate strip, and continuous sidewalls or a plurality of sidewalls.

One aspect is a spacer comprising: a first elongate strip; a second elongate strip; and at least one extruded sidewall engaging the first elongate strip to the second elongate strip.

Another aspect is a sealed unit assembly comprising: a first transparent material; a second transparent material; and a spacer assembly disposed between the first and second transparent materials, the spacer assembly comprising: a first elongate strip having a first side adjacent the first transparent material and a second side adjacent the second transparent material; a second elongate strip having a first side adjacent the first transparent material and second side adjacent the second transparent material; and at least one sidewall connecting the first elongate strip to the second elongate strip.

Yet another aspect is a method of making a spacer, the method comprising: arranging at least a portion of a first elongate strip and a second elongate strip in a spaced relationship, the first elongate strip including a first surface and the second elongate strip including a second surface; extruding a material through an extrusion nozzle to form at least one sidewall; and moving the extrusion nozzle relative to the first and second elongate strips while extruding to apply the material to the first surface of the first elongate strip and to the second surface of the second elongate strip to connect the first and second elongate strips.

A further aspect is a method of making a spacer, the method comprising: forming a first sidewall portion onto a first elongate strip, the first sidewall portion including a protrusion; and forming a second sidewall portion onto a second elongate strip, the second sidewall portion including a notched portion.

Another aspect is a spacer comprising: a first elongate strip; a second elongate strip; a first sidewall portion having a first fastening mechanism, the first sidewall portion attached to the first elongate strip; and a second sidewall portion having a second fastening mechanism, the second sidewall portion attached to the second elongate strip, wherein the first fastening mechanism is arranged and configured to securely engage with the second fastening mechanism to connect the first sidewall portion to the second sidewall portion.

There is no requirement that an arrangement include all features characterized herein to obtain some advantage according to the present disclosure.

DETAILED DESCRIPTION

Figure 1:
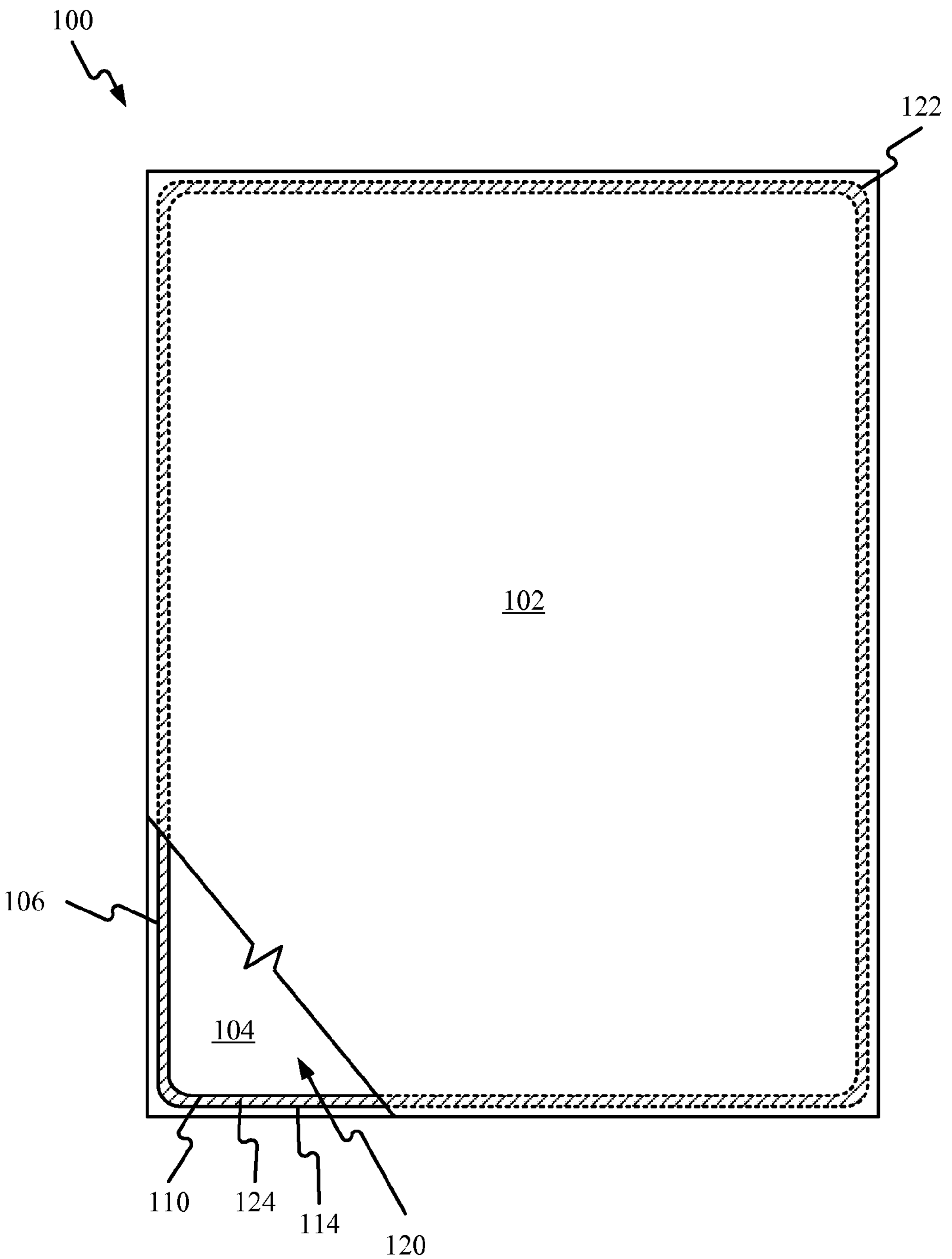
FIG. 1 is a schematic front view of a window assembly according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
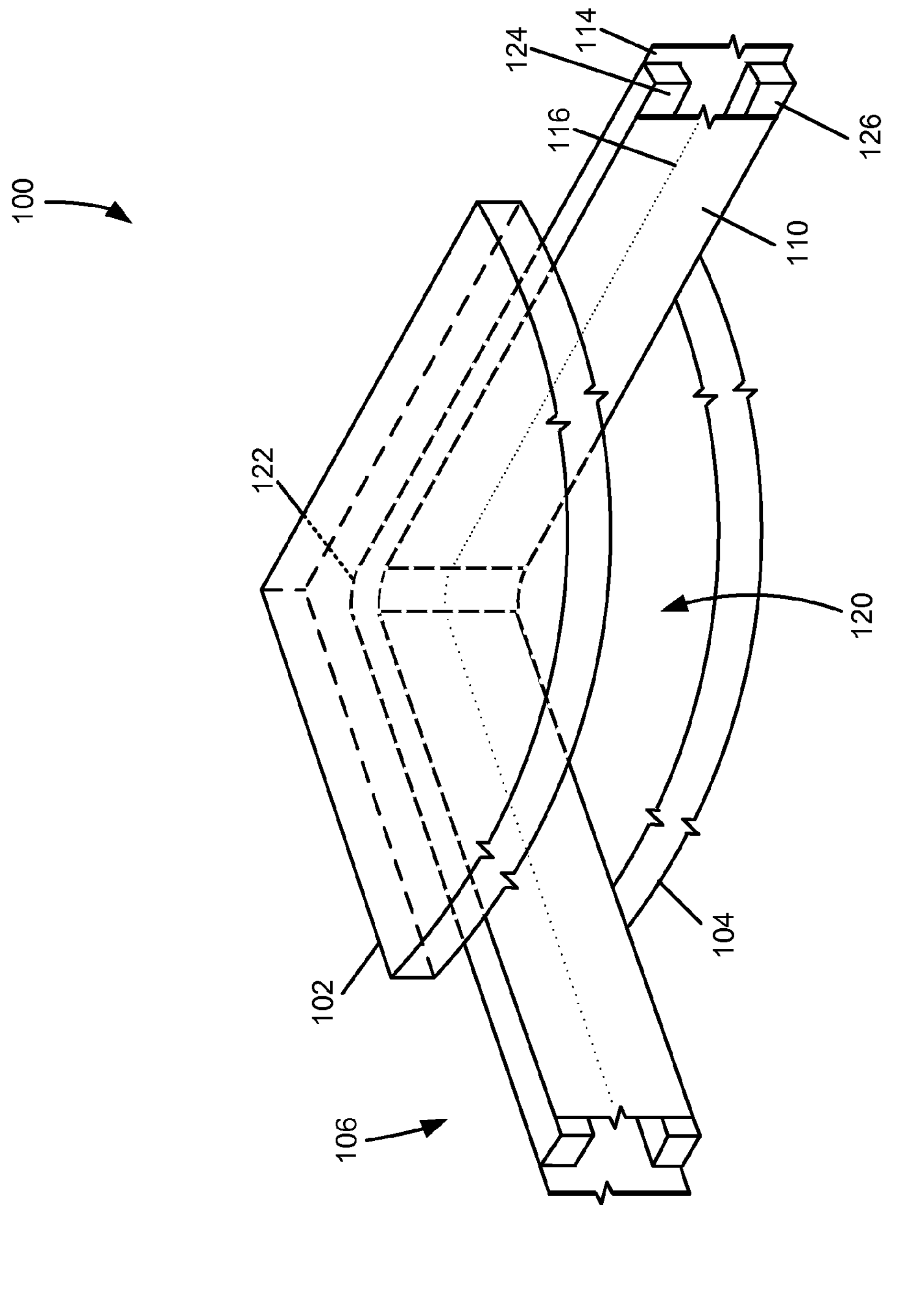
FIG. 2 is a schematic perspective view of a corner section of the window assembly shown in FIG. 1.

FIGS. 1 and 2 illustrate a window assembly 100 according to the present disclosure. FIG. 1 is a schematic front view of window assembly 100. FIG. 2 is a schematic perspective view of a corner section of window assembly 100.

Window assembly 100 includes sheet 102, sheet 104, and spacer 106. Sheets 102 and 104 are made of a material that allows at least some light to pass through. Typically, sheets 102 and 104 are made of a transparent material, such as glass, plastic, or other suitable materials. Alternatively, a translucent or semi-transparent material is used, such as etched, stained, or tinted glass or plastic.

Spacer 106 includes elongate strip 110, elongate strip 114, and sidewalls 124 and 126. In some embodiments, spacer 106 also includes filler 112. Spacer 106 is disposed between sheets 102 and 104 to keep sheets 102 and 104 spaced from each other. Typically, spacer 106 is arranged to form a closed loop near to the perimeter of sheets 102 and 104. Spacer 106 is able to withstand compressive forces applied to sheets 102 and/or 104 to maintain a desired space between sheets 102 and 104. An interior space 120 is defined within window assembly 100 by spacer 106 and sheets 102 and 104.

Elongate strips 110 and 114 are typically long and thin strips of a solid material, such as metal or plastic. An example of a suitable metal is stainless steel. An example of a suitable plastic is a thermoplastic polymer, such as polyethylene terephthalate. A material with low or no permeability is preferred in some embodiments. Some embodiments include a material having a low thermal conductivity.

On their own, elongate strips 110 and 114 are typically flexible, including both bending and torsional flexibility. In some embodiments, bending flexibility allows an assembled spacer 106 to be bent to form non-liner shapes (e.g., curves). Bending and torsional flexibility also allows for ease of window manufacturing. Such flexibility includes either elastic or plastic deformation such that elongate strips 110 or 114 do not fracture during installation into window assembly 100. Some embodiments of spacer 106 include elongate strips that do not have substantial flexibility, but rather are substantially rigid. In some embodiments, elongate strips 110 and 114 are flexible, but the resulting spacer 106 is substantially rigid. In some embodiments, elongate strips 110 and 114 act to protect filler 112 from ultraviolet radiation.

Some embodiments include filler 112 that is arranged between elongate strip 110 and elongate strip 114. In some embodiments, filler 112 is a deformable material. Being deformable may allow spacer 106 to be formed around corners of window assembly 100. In some embodiments, filler 112 is a desiccant that acts to remove moisture from interior space 120. Desiccants include molecular sieve and silica gel type desiccants. One example of a desiccant is a beaded desiccant, such as PHONOSORB® molecular sieve beads manufactured by W. R. Grace & Co. of Columbia, Md. If desired, an adhesive is used to attach beaded desiccant between elongate strips 110 and 114.

In other embodiments, filler 112 is a material that provides support to elongate strips 110 and 114 to provide increased structural strength. In embodiments that include filler 112, filler 112 fills space between elongate strips 110 and 114 to support elongate strips 110 and 114. As a result, spacer 106 does not rely solely on the strength and stability of elongate strips 110 and 114 to maintain appropriate spacing between sheets 102 and 104 and to prevent buckling, bending, or breaking Furthermore, thermal transfer through elongate strips 110 and 114 is also reduced. In some embodiments, filler 112 is a matrix desiccant material that not only acts to provide structural support between elongate strips 110 and 114, but also removes moisture from interior space 120.

Examples of a filler material include adhesive, foam, putty, resin, silicon rubber, or other materials. Some filler materials are a desiccant or include a desiccant, such as a matrix material. Matrix material includes desiccant and other filler material. Examples of matrix desiccants include those manufactured by W.R. Grace & Co. and H.B. Fuller Corporation. In some embodiments a beaded desiccant is combined with another filler material.

In some embodiments, filler 112 is made of a material providing thermal insulation. The thermal insulation reduces heat transfer through spacer 106 both between sheets 102 and 104, and between the interior space 120 and an exterior side of spacer 106.

In some embodiments, elongate strip 110 includes a plurality of apertures 116 (shown in FIG. 2). Apertures 116 allow gas and moisture to pass through elongate strip 110. As a result, moisture located within interior space 120 is allowed to pass through elongate strip 110 where it is removed by desiccant of filler 112. In another embodiment, apertures 116 are used for registration. In yet another embodiment, apertures provide reduced thermal transfer. In one example, apertures 116 have a diameter in a range from about 0.002 inches to about 0.050 inches. Apertures 116 are made by any suitable method, such as cutting, punching, drilling, laser forming, or the like.

Spacer 106 can be connected to sheets 102 and 104. In some embodiments, spacer 106 is connected to sheets 102 and 104 by a fastener. An example of a fastener is a sealant or adhesive, as described in more detail below. In other embodiments, a frame, sash, or the like is constructed around window assembly 100 to support spacer 106 between sheets 102 and 104. In some embodiments, spacer 106 is connected to the frame or sash by a fastener, such as adhesive. Also in possible embodiments, spacer 106 is fastened to the frame or sash prior to installation of sheets 102 and 104.

In some embodiments, ends of spacer 106 can be connected together with a fastener to form a closed loop. As such, spacer 106 and sheets 102 and 104 together define an interior space 120 of window assembly 100. Interior space 120 reduces heat transfer through window assembly 100.

When the window assembly 100 is fully assembled, a gas is sealed within interior space 120. In some embodiments, the gas is air. Other embodiments include oxygen, carbon dioxide, nitrogen, or other gases. Yet other embodiments include an inert gas, such as helium, neon or a noble gas such as krypton, argon, and the like. Combinations of these or other gases are used in other embodiments.

Figure 3:
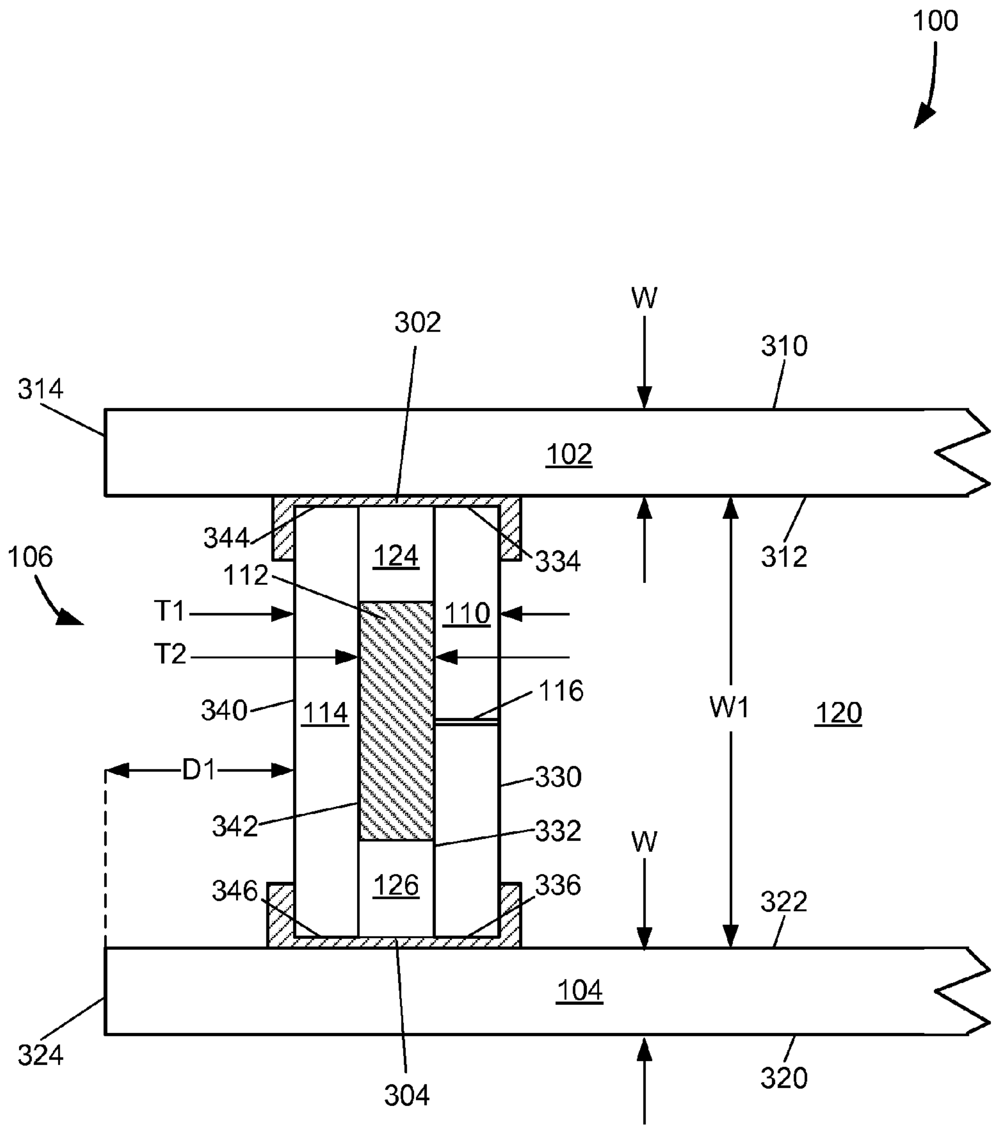
FIG. 3 is a schematic cross-sectional view of a portion of the window assembly shown in FIG. 1 including a first sealant.

FIG. 3 is a schematic cross-sectional view of a portion of window assembly 100. In this embodiment, window assembly 100 includes sheet 102, sheet 104, spacer 106, and also includes sealants 302 and 304.

Sheet 102 includes outer surface 310, inner surface 312, and perimeter 314. Sheet 104 includes outer surface 320, inner surface 322, and perimeter 324. In one example, W is the thickness of sheets 102 and 104. W is typically in a range from about 0.05 inches to about 1 inch, and preferably from about 0.1 inches to about 0.5 inches. Other embodiments include other dimensions.

Spacer 106 is arranged between inner surface 312 and inner surface 322. Spacer 106 is typically arranged near perimeters 314 and 324. In one example, D1 is the distance between perimeters 314 and 324 and spacer 106. D1 is typically in a range from about 0 inches to about 2 inches, and preferably from about 0.1 inches to about 0.5 inches. However, in other embodiments spacer 106 is arranged in other locations between sheets 102 and 104.

Spacer 106 maintains a space between sheets 102 and 104. In one example, W1 is the overall width of spacer 106 and the distance between sheets 102 and 104. W1 is typically in a range from about 0.1 inches to about 2 inches, and preferably from about 0.3 inches to about 1 inch. Other embodiments include other spaces.

Spacer 106 includes elongate strip 110, elongate strip 114, sidewall 124, and sidewall 126. Elongate strip 110 includes external surface 330, internal surface 332, edge 334, edge 336, and apertures 116. Elongate strip 114 includes external surface 340, internal surface 342, edge 344, and edge 346. In some embodiments, external surface 330 of elongate strip 110 is visible by a person when looking through window assembly 100. External surface 330 of elongate strip 110 provides a clean and finished appearance to spacer 106. A benefit of some embodiments of spacer 106 is that roll forming is not required to bend elongate strips 110 and 114. However, other embodiments use roll forming.

In one example, T1 is the overall thickness of spacer 106 from external surface 330 to external surface 340. T1 is typically in a range from about 0.02 inches to about 1 inch, and preferably from about 0.1 inches to about 0.5 inches. T2 is the distance between elongate strip 110 and elongate strip 114, and more specifically the distance from internal surface 332 to interior surface 342. T2 is also the thickness of filler material 112. T2 is in a range from about 0.02 inches to about 0.5 inches, and preferably from about 0.05 inches to about 0.15 inches. In some embodiments elongate strips 110 and 114 and filler 112 are not linear, some examples have an undulating shape such as described below and shown in FIG. 4. As a result, spacer 106 does not always have a constant thickness in all embodiments. As a result, T2 is an average thickness in some embodiments. Other embodiments include other dimensions.

In this embodiment, a first sealant 302 and 304 is used to connect spacer 106 to sheets 102 and 104. In one embodiment, sealant 302 is applied to an edge of spacer 106, such as on edges 334 and 344, and the edge of filler 112 and then pressed against inner surface 312 of sheet 102. Sealant 304 is also applied to an edge of spacer 106, such as on edges 336 and 346, and an edge of filler 112 and then pressed against inner surface 322 of sheet 104. In other embodiments, beads of sealant 302 and 304 are applied to sheets 102 and 104, and spacer 106 is then pressed into the beads.

In some embodiments, sealants 302 and 304 are formed of a material having adhesive properties, such that sealants 302 and 304 acts to fasten spacer 106 to sheets 102 and 104. Typically, sealant 302 and 304 is arranged to support spacer 106 is an orientation normal to inner surfaces 312 and 322 of sheets 102 and 104. First sealant 302 and 304 also acts to seal the joint formed between spacer 106 and sheets 102 and 104 to inhibit gas or liquid intrusion into interior space 120. Examples of first sealant 302 and 304 include polyisobutylene (PIB), butyl, curable PIB, holt melt silicon, acrylic adhesive, acrylic sealant, and other Dual Seal Equivalent (DSE) type materials.

First sealant 302 and 304 is illustrated as extending out from the edges of spacer 106, such that the first sealant 302 and 304 contacts surfaces 330 and 340 of elongate strips 110 and 114. Such contact is not required in all embodiments. However, the additional contact area between first sealant 302 and 304 and spacer 106 can be beneficial. For example, the additional contact area increases adhesion strength. The increased thickness of sealants 302 and 304 also improves the moisture and gas barrier. In some embodiments, however, sealants 302 and 304 do not extend beyond external surfaces 330 and 340 of spacer 106.

In some embodiments, portions of elongate strip 114 are connected to elongate strip 110 without filler 112 between. For example, a portion of elongate strip 114 may be connected to elongate strip 110 with a fastener, such as a adhesive, weld, rivet, or other fastener.

Figure 4:
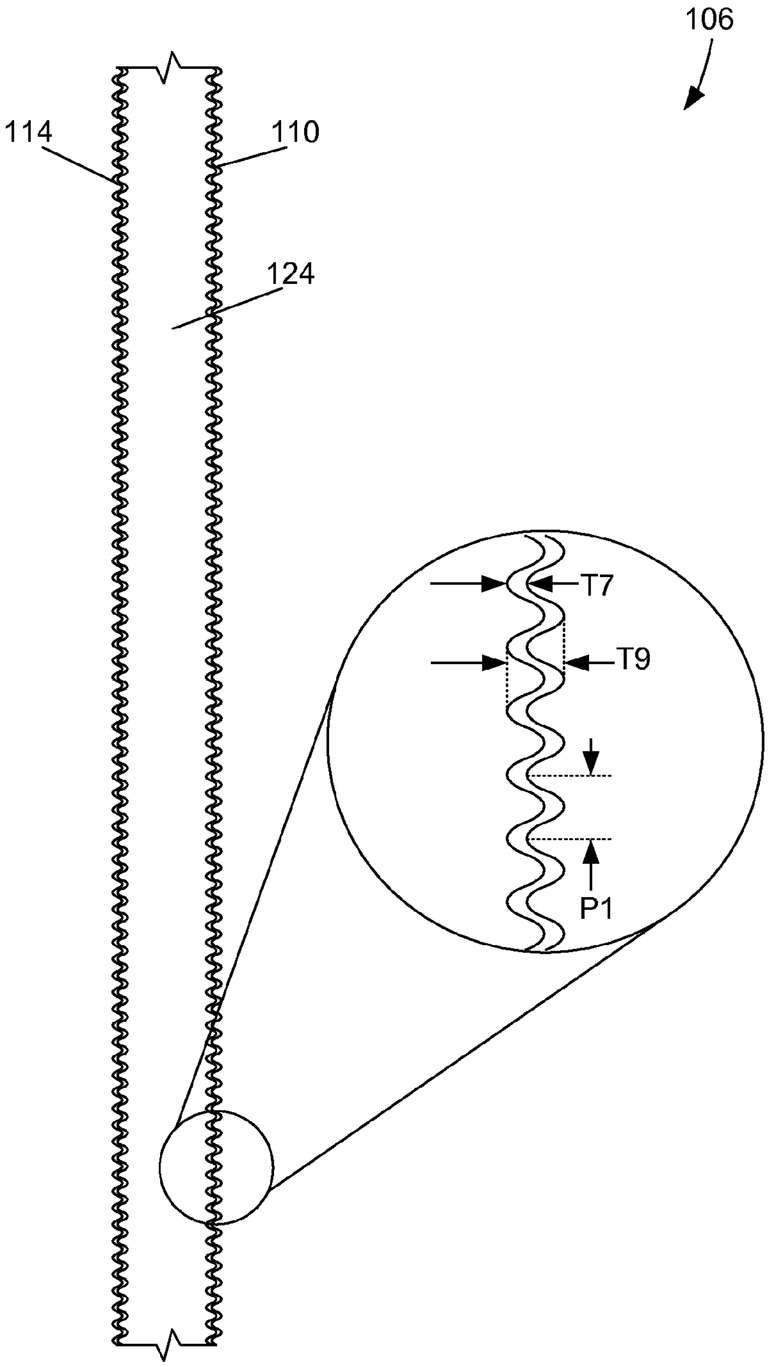
FIG. 4 is a schematic front view of a portion of another embodiment of the spacer.

FIG. 4 is a schematic front view of a portion of an example embodiment of spacer 106. Spacer 106 includes elongate strip 110, sidewall 124, and elongate strip 114. In this embodiment, elongate strips 110 and 114 have an undulating shape. In some embodiments, elongate strips 110 and 114 are formed of a metal ribbon, such as stainless steel, which is then bent into the undulating shape. Some possible embodiments of the undulating shape include sinusoidal, arcuate, square, rectangular, triangular, and other desired shapes. Some embodiments are formed of other materials, and can be formed by other processes, such as molding. Note that while FIG. 4 shows elongate strips 110 and 110 having similar undulations, it is contemplated that elongate strip 114 may have an undulating shape that is much larger than the undulating shape of elongate strip 110 and vice versa. Another possible embodiment includes a flat elongate strip combined with either type of undulating strip. Other combinations and arrangements are also possible.

One of the benefits of the undulating shape is that the flexibility of elongate strips 110 and 114 is increased, including bending and torsional flexibility. The undulating shape resists permanent deformation, such as kinks and fractures. This allows elongate strips 110 and 114 to be more easily handled during manufacturing without damaging elongate strips 110 and 114. The undulating shape also increases the structural stability of elongate strips 110 and 114 to improve the ability of spacer 106 to withstand compressive and torsional loads. Some embodiments of elongate strips 110 and 114 are also able to extend and contract, which is beneficial, for example, when spacer 106 is formed around a corner. In some embodiments, the undulating shape reduces the need for notching or other stress relief.

In one example, elongate strips 110 and 114 have material thicknesses T7. T7 is typically in a range from about 0.0001 inches to about 0.010 inches, and preferably from about 0.0003 inches to about 0.004 inches. Such thin material thickness reduces material costs and reduces thermal conductivity through elongate strips 110 and 114. The undulating shape of elongate strips 110 and 114 defines a waveform having a peak-to-peak amplitude and a peak-to-peak period. The peak-to-peak amplitude is also the overall thickness T9 of elongate strips 110 and 114. T9 is typically in a range from about 0.005 inches to about 0.1 inches, and preferably from about 0.02 inches to about 0.04 inches. P1 is the peak-to-peak period of undulating elongate strips 110 and 114. P1 is typically in a range from about 0.005 inches to about 0.1 inches, and preferably from about 0.02 inches to about 0.04 inches. As described with reference to FIG. 7, larger waveforms are used in other embodiments. Yet other embodiments include other dimensions.

Figure 5:
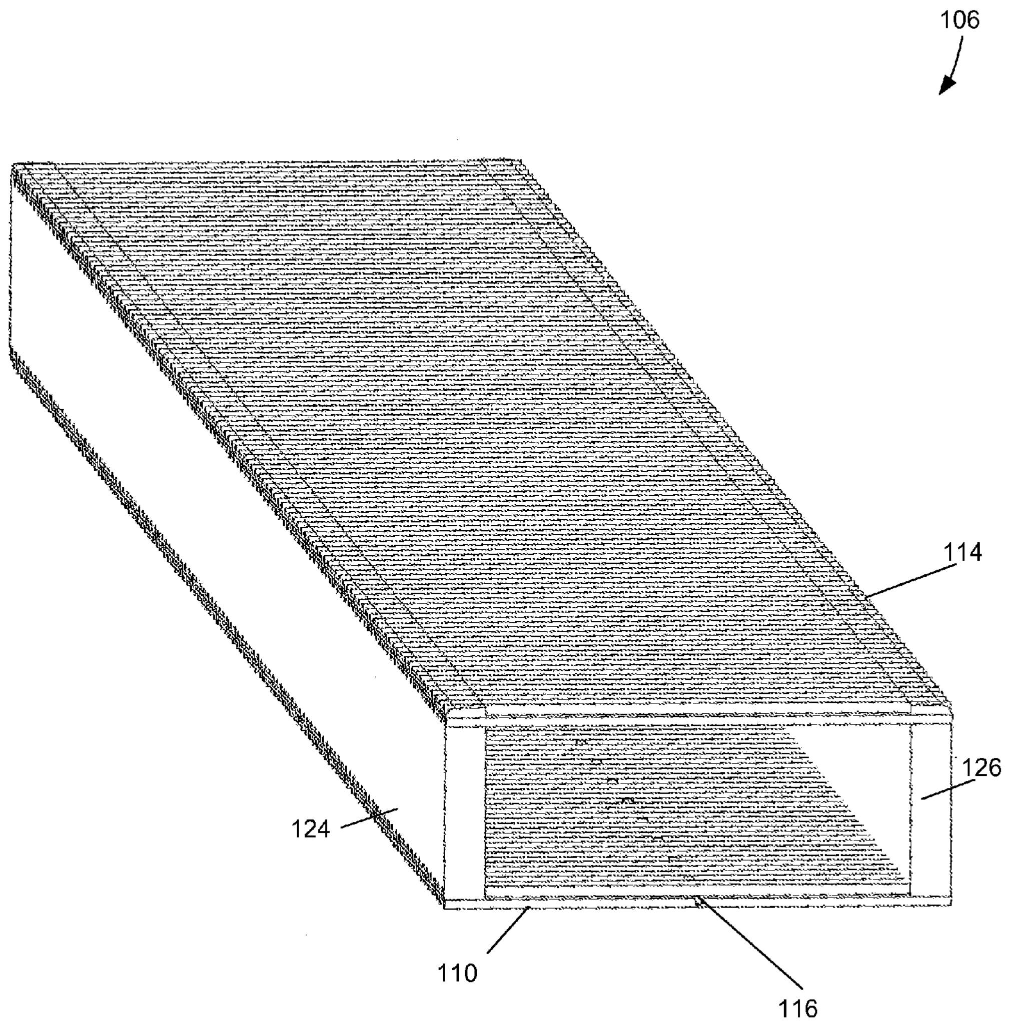
FIG. 5 is a perspective schematic of a spacer.
Figure 6:
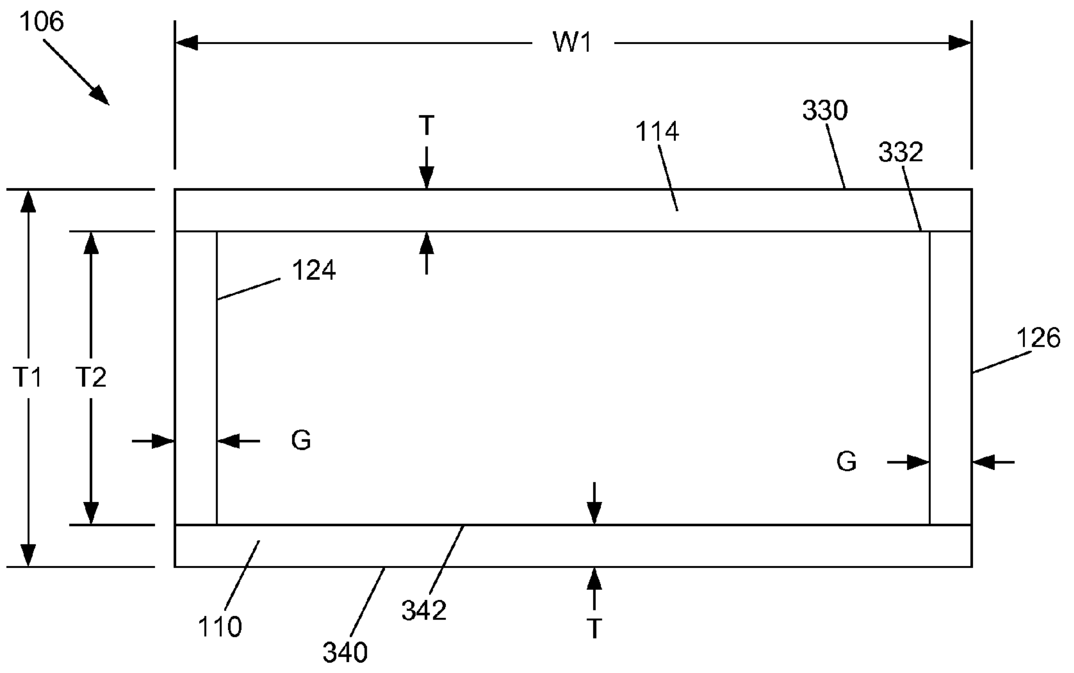
FIG. 6 is a schematic cross-sectional view of a portion of the spacer shown in FIG. 5.
Figure 7:
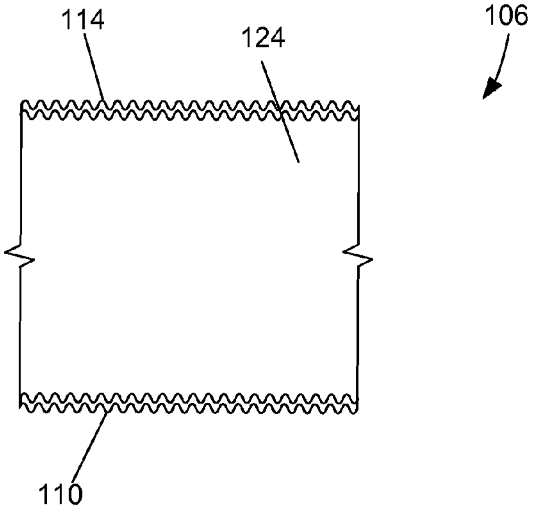
FIG. 7 is a side view of a portion of the spacer shown in FIG. 5.

FIGS. 5-7 illustrate an example embodiment of spacer 106 in which continuous sidewalls 124 and 126 are arranged at edges of elongate strips 110 and 114. FIG. 5 is a schematic perspective view of the example spacer 106. FIG. 6 is a cross-sectional view of the example spacer 106 shown in FIG. 5. FIG. 7 is a schematic side view of the example spacer 106 shown in FIG. 5. Spacer 106 includes elongate strips 110 and 114 separated by sidewalls 124 and 126. In this example, sidewalls 124 and 126 are continuous along the length of spacer 106. Sidewalls 124 and 126 provide a uniform or substantially uniform spacing between elongate strips 110 and 114.

Some embodiments of spacer 106 are made according to the following process. Elongate strips 110 and 114 are typically formed first. The elongate strips 110 and 114 are made of a material, such as metal, that is formed into a thin and long ribbon (or multiple ribbons), such as by cutting the ribbon from a larger sheet. The thin and long ribbon is then shaped to include the undulating shape, if desired. The thin and long ribbon may also be punched or drilled to form apertures 116 in elongate strip 110, if desired. This is accomplished, for example, by passing the thin and long ribbon between a pair of corrugated rollers. The teeth of the roller bend the ribbon into an undulating shape. Different undulating shapes are possible in different embodiments by using rollers having appropriately shaped teeth. Example teeth shapes include sinusoidal teeth, triangular teeth, semi-circular teeth, square (or rectangular) teeth, saw-tooth shaped teeth, or other desired shapes. Elongate strips having no undulating pattern are used in some embodiments, in which case the thin and long ribbons typically do not require further shaping. The elongate strips 110 and 114 may alternatively be formed by other processes, such as by molding or extruding.

In some embodiments, elongate strips 110 and 114 are cut to a desired length while they are still in the long and thin ribbon form and prior to forming the undulating shape. In other embodiments, elongate strips are cut after forming the undulating shape. Another possible embodiment forms long and substantially continuous spacers 106 that are cut to length after forming spacer 106 including elongate strips 110 and 114 as well as sidewalls 124 and 126. In some embodiments spacer 106 is formed to have a length sufficient to extend along an entire perimeter of a window. In other embodiments, spacer 106 is formed to have a length sufficient for a single side or portion of a window.

After the elongate strips 110 and 114 are formed, sidewalls 124 and 126 are formed between elongate strips 110 and 114. In one possible embodiment, elongate strips 110 and 114 are passed through a guide that orients elongate strips 110 and 114 in a parallel arrangement and spaces them a desired distance apart. An extrusion die is arranged near the guide and between elongate strips 110 and 114. As the elongate strips 110 and 114 pass through the guide, a sidewall material is extruded into the space between elongate strips 110 and 114, such as shown in FIG. 5. Extrusion typically involves heating the sidewall material and using a hydraulic press to push the sidewall material through the extrusion die. In this example, continuous sidewalls 124 and 126 are formed at each end of elongate strips 110 and 114. The guide presses the extruded sidewalls 124 and 126 against interior surfaces of elongate strips 110 and 114, such that the sidewalls 124 and 126 conform to the undulating shape and adhere to elongate strips 110 and 114.

In another possible embodiment, sidewalls 124 and 126 are extruded into the space between elongate strips 110 and 114, while the elongate strips are held stationary in a guide or template that acts to maintain the appropriate alignment and spacing of the elongate strips 110 and 114 while sidewalls 124 and 126 are inserted therein. For example, a robotic arm is used to guide an extrusion die along the space between elongate strips 110 and 114. The robotic arm moves the extrusion die to position the extruded sidewalls 124 and 126 within the elongate strips 110 and 114 that remain stationary during the process. In some embodiments, extruded sidewalls 124 and 126 are formed in separate steps. In other embodiments, extruded sidewalls 124 and 126 are formed simultaneously, such as using two extrusion dies.

In another possible embodiment, sidewalls 124 and 126 are formed by passing the sidewall material through a series of rollers, to roll form the sidewalls into a desired shape. The roll formed sidewalls are then inserted between elongate strips 110 and 114. In some embodiments the sidewall material is heated and pressed against elongate strips 110 and 114 to shape and bond the sidewalls 124 and 126 to the elongate strips 110 and 114. In other embodiments, an adhesive is used to bond sidewalls 124 and 126 to elongate strips 110 and 114.

In another possible embodiment, sidewalls 124 and 126 are formed by molding. After molding, the sidewalls 124 and 126 are inserted into the space between elongate strips. In some embodiments a fastener, such as an adhesive, is used to bond sidewalls 124 and 126 to elongate strips 110 and 114. In another possible embodiment, portions of sidewalls 124 and 126 are melted and pressed against elongate strips 110 and 114 such that they grip the undulating shaped surface.

In some embodiments, sidewalls 124 and 126 are rigid. When rigid sidewalls are mated with elongate strips 110 and 114, the resulting spacer also becomes rigid because the sidewalls 124 and 126 act to prevent flexing of elongate strips 110 and 114. Other embodiments, however, include sidewalls 124 and 126 that are formed of a material having elastic or plastic flexibility, such that spacer 106 is flexible.

Although two sidewalls are illustrated in this example, other embodiments include one or more sidewalls (e.g., three, four, five, etc.). Further, sidewalls need not be located at sides of spacer 106. For example, one or more additional sidewalls are included at or about the center of spacer 106 in some embodiments.

Additional features are formed in spacers 106 in some embodiments. An example of an additional feature is a muntin bar hole for mounting of a muntin bar. Muntin bar holes can be formed in spacer 106 or in elongate strip 116 either during the formation of elongate strip 116 or spacer 106, or after the formation of spacer 106.

In some embodiments spacer 106 is connected to one or more sheets 102 and/or 104, such as shown in FIG. 1. Spacer 106 can be connected to sheet 102 during or after the spacer 106 manufacturing processes discussed above. One or more sealant and/or adhesive materials are used in some embodiments to fasten spacer 106 to one or more sheets 102 and/or 104.

FIG. 6 is a cross sectional view of the example spacer 106 shown in FIG. 5. Spacer 106 includes elongate strip 110, elongate strip 114 sidewall 124 and sidewall 126. Elongate strip 110 includes external surface 340 and internal surface 342. Elongate strip 114 includes external surface 330 and internal surface 332. In the example embodiment shown in FIG. 6, sidewalls 124 and 126 are flush with or substantially flush with edges of elongate strips 110 and 114.

Example dimensions are now described with reference to FIG. 6 for an example embodiment as shown, but other embodiments include other dimensions. In one example, W1 is the overall width of spacer 106. W1 is typically in a range from about 0.1 inches to about 2 inches, and preferably from about 0.3 inches to about 1 inch. T1 is the overall thickness of spacer 106 from external surface 330 to external surface 340. T1 is typically in a range from about 0.02 inches to about 1 inch, and preferably from about 0.1 inches to about 0.5 inches. T2 is the distance between elongate strip 110 and elongate strip 114, and more specifically the distance from internal surface 332 to interior surface 342. T2 is also the height of sidewalls 124 and 126, which maintain the space between elongate strips 110 and 114. T2 is in a range from about 0.02 inches to about 0.5 inches, and preferably from about 0.05 inches to about 0.15 inches. In some embodiments elongate strips 110 and 114 and filler 112 are non-linear, such as having an undulating shape described below. In some of these embodiments, T2 is an average thickness. G is the thickness of sidewalls 110 and 114. G is typically in a range from about 0.01 inches to about 0.5 inches, and preferably from about 0.1 inches to about 0.3 inches. Other embodiments include other dimensions than those discussed in this example.

FIG. 7 is a schematic side view of the example spacer 106 shown in FIG. 5. The spacer 106 includes elongate strips 110 and 114 and sidewall 124. This side view illustrates the undulating shape of example elongate strips 110 and 114. Further details regarding the undulating shape are described herein with reference to FIG. 4. In this example, edges of sidewall 124 have an undulating shape that mates with the undulating shape of elongate strips 110 and 114.

Figure 8:
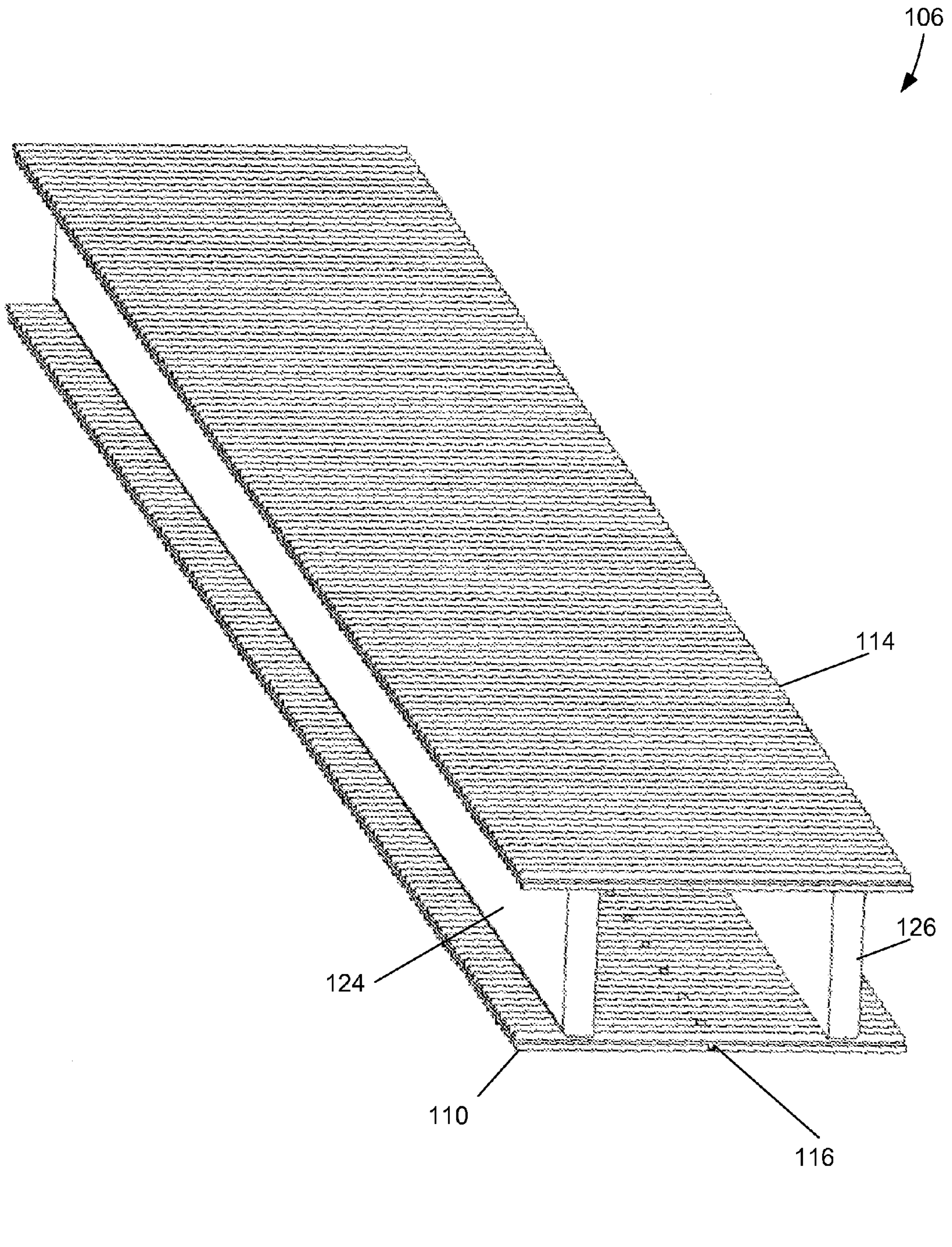
FIG. 8 is a perspective schematic of a spacer.
Figure 9:
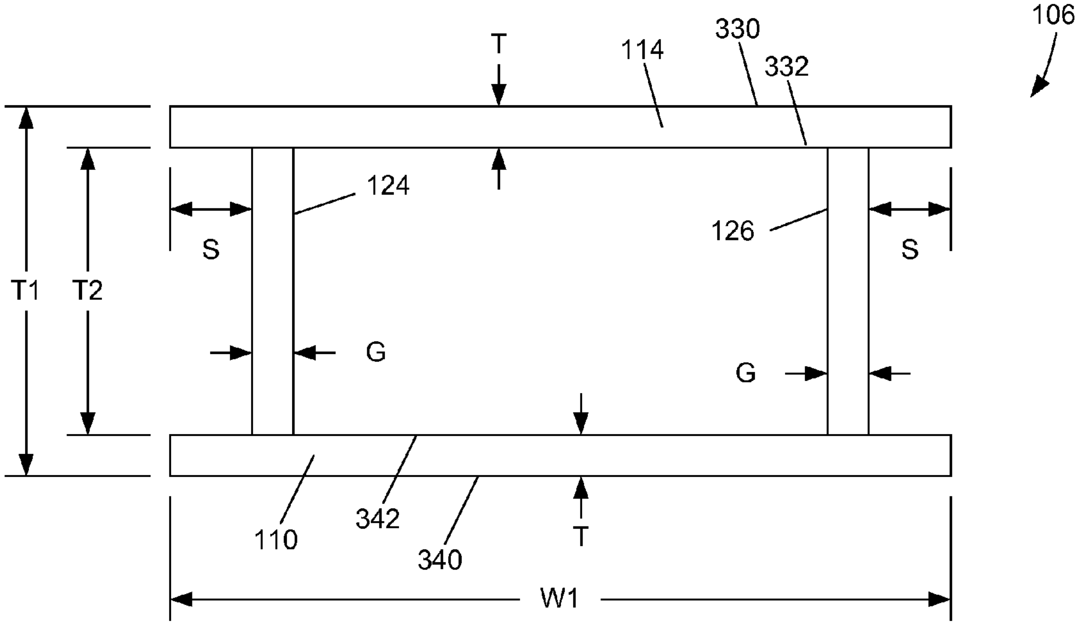
FIG. 9 is a schematic cross-sectional view of a portion of the spacer shown in FIG. 8.
Figure 10:
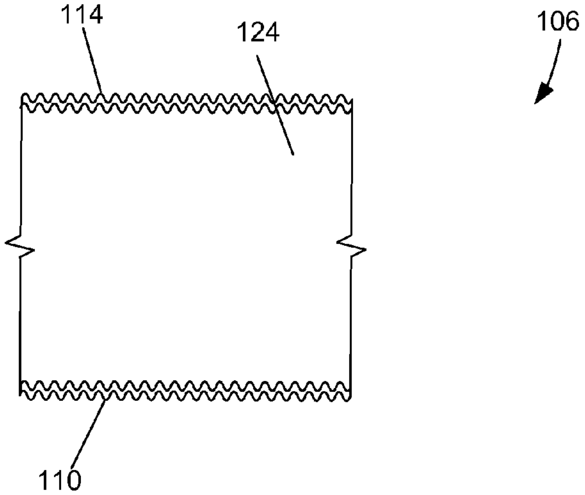
FIG. 10 is a side view of a portion of the spacer shown in FIG. 8.

FIGS. 8-10 illustrate an example embodiment of spacer 106 in which continuous sidewalls 124 and 126 are arranged at intermediate positions between edges of elongate strips 110 and 114. FIG. 8 is a schematic perspective view of the example spacer of the example spacer 106. FIG. 9 is a cross-sectional view of the example spacer 106 shown in FIG. 8. FIG. 10 is as schematic side view of the example spacer 106 shown in FIG. 8. Spacer 106 includes elongate strips 110 and 114 separated by sidewalls 124 and 126. In this example, sidewalls 124 and 126 are continuous along the length of space or 106. The sidewalls 124 and 126 provide a uniform or substantially uniform spacing between elongate strips 110 and 114.

In the example embodiment of spacer 106, shown in FIGS. 8-10, sidewalls 124 and 126 are offset from the edges of the wanted strips 110 and 114. The offset is illustrated in FIG. 9 by offset distance S. In one example, offset distance S is typically in a range from about 0.01 inches to about 0.5 inches, and preferably from about 0.1 inches to about 0.3 inches. Other example dimensions shown in FIG. 9 are described in more detail herein, such as with reference to FIGS. 3 and 6.

In some embodiments, the offset of sidewalls 124 and 126 provides additional structural stability to toward the center of elongate strips 110 and 114, such as to increase the resistance of space or 106 two pending or buckling under a load. In some embodiments, the offset also provides a space for adhesive, sealants, or other materials. For example, a space is defined between edges of elongate strips 110 and 114 and adjacent to offset sidewall 124. A bead of sealant is applied to this space in some embodiments. The sheet of transparent material is then applied to the bead to connect and seal edges of spacer 106 to the sheet of transparent material. Sealant is also applied to a space formed adjacent to offset sidewall 126 in some embodiments, which is then used to connect and seal the edge of spacer 106 to another sheet of transparent material.

Figure 11:
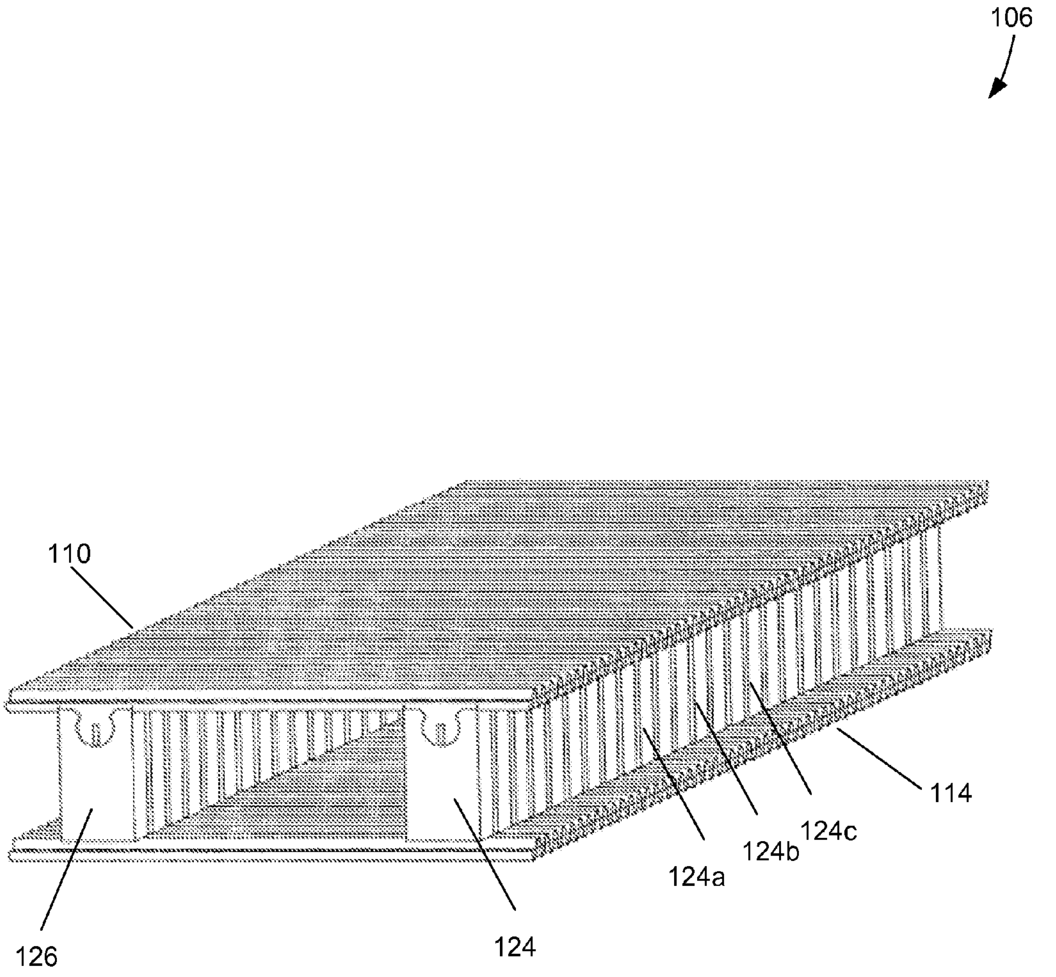
FIG. 11 is a perspective schematic of a spacer.
Figure 12:
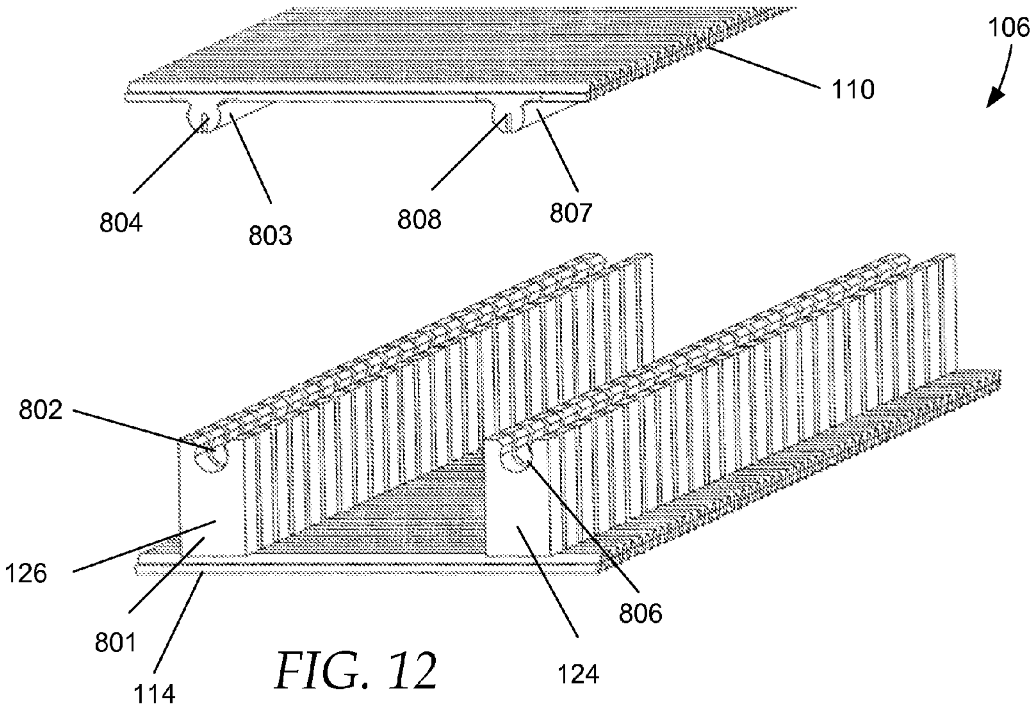
FIG. 12 is an exploded assembly perspective schematic of the spacer shown in FIG. 11.
Figure 13:
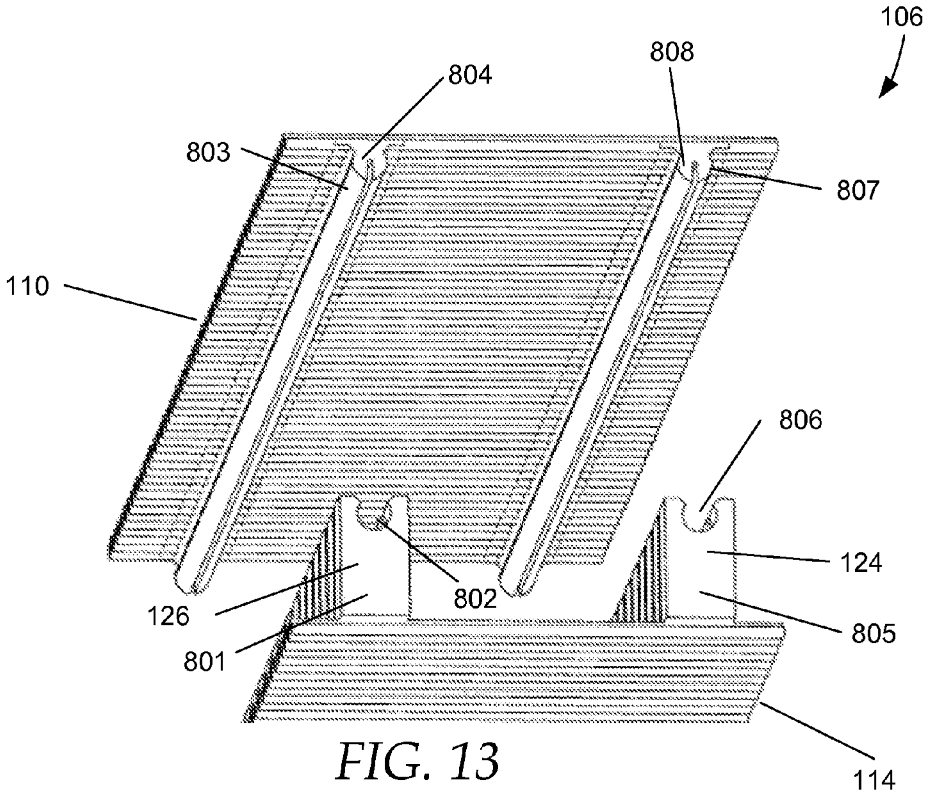
FIG. 13 is an exploded assembly perspective schematic of the spacer shown in FIG. 11.
Figure 14:
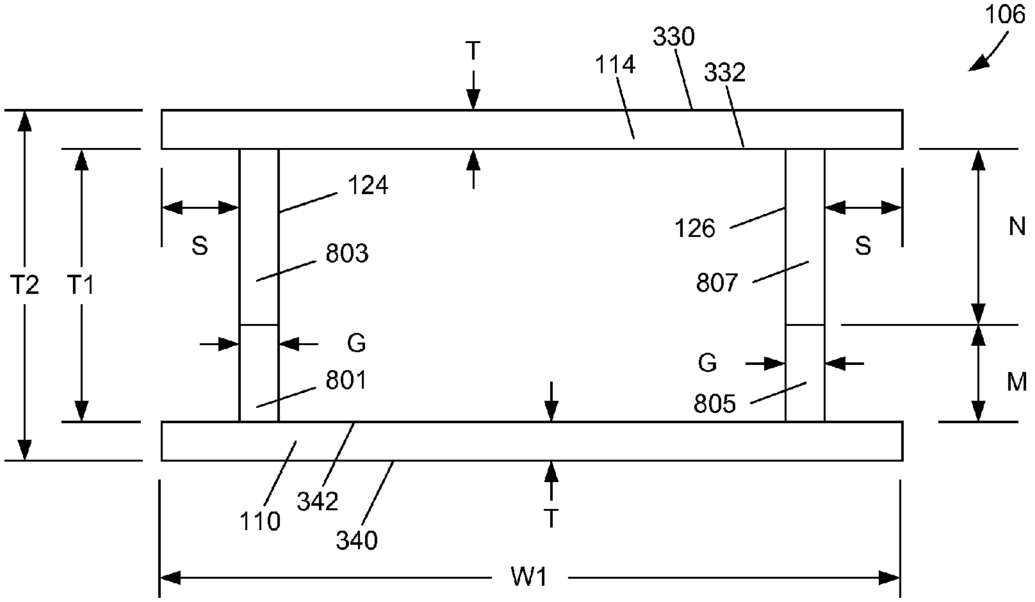
FIG. 14 is a schematic cross-sectional view of a portion of the spacer shown in FIG. 11.
Figure 15:
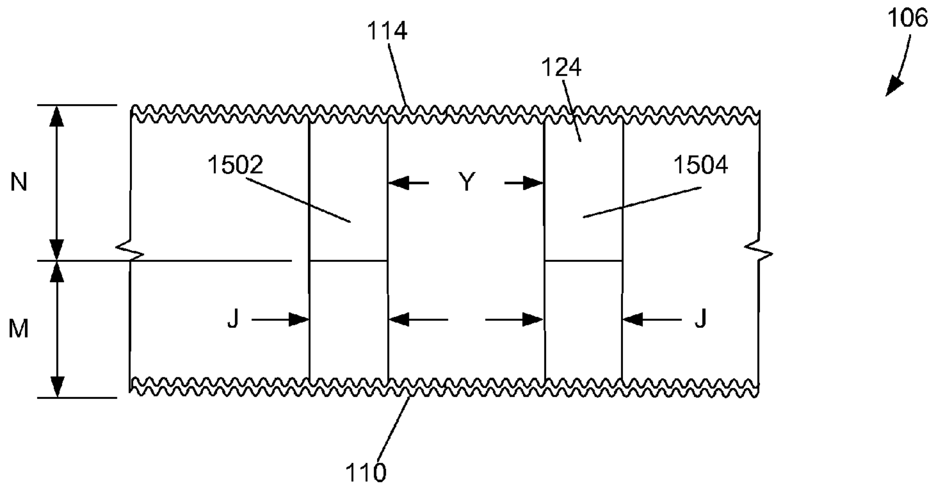
FIG. 15 is a side view of a portion of the spacer shown in FIG. 11.

FIGS. 11-15 illustrate another example embodiment of spacer 106 including divided sidewalls. FIG. 11 is a schematic perspective view of the example spacer 106 arranged in an assembled configuration. FIG. 12 is a schematic perspective view of the example spacer 106 shown in FIG. 11 arranged in an unassembled configuration. FIG. 13 is another schematic perspective view of the example spacer 106 shown in FIG. 11 arranged in an unassembled configuration. FIG. 14 is a cross-sectional view of the example spacer 106 shown in FIG. 11 arranged in an assembled configuration. FIG. 15 is a side view of the example spacer 106 shown in FIG. 11 arranged in an assembled configuration.

Spacer 106 includes elongate strips 110 and 114 and sidewalls 124 and 126. In some embodiments elongate strip 110 includes apertures to allow moisture to pass through elongate strip 110. Filler 112, such as including a desiccant, is included within spacer 106 in some embodiments, but is not shown here. Some embodiments do not include filler 112.

In this example, sidewalls 124 and 126 are located at an intermediate position between the edges of elongate strips 110 and 114, but in other embodiments sidewalls 124 and 126 are flush with edges of elongate strips 110 and 114.

Spacer 106 includes sidewalls 124 and 126. The example spacer 106 shown in FIGS. 11-13 includes non-continuous sidewalls 124 and 126, including a plurality of spaced sidewall portions. Other embodiments, however, include continuous sidewalls without spaces. In some embodiments, the space between sidewall portions allows spacer 106 to utilize the flexibility of elongate strips 110 and 114 and provides room for the spacer 106 to bend. As a result, spacer 106 can be bent to form a corner (such as a 90 degree corner).

Sidewall 124 includes a first portion 801, second portion 803, and an example fastening mechanism. A particular example of a fastening mechanism includes a spline and a notched portion. However, it is recognized that a variety of other fastening mechanisms are used in other embodiments. Some alternate examples of fastening mechanisms are described herein. First portion 801 includes a spline 802 as part of the fastening mechanism, alternatively referred to as a protrusion, and is connected to elongate strip 114. Second portion 803 includes a notched portion 804 as another portion of the fastening mechanism, and is connected to elongate strip 110. First and second portions 801 and 803 are engageable with each other using the fastening mechanism to form sidewall 124. In some embodiments, first and second portions 801 and 803 are also separable from each other to separate elongate strip 110 from elongate strip 114.

Sidewall 126 includes a first portion 805 and a second portion 807. First portion 805 includes a spline 806, alternatively referred to as a protrusion, and is connected to elongate strip 114. Second portion 807 includes a notched portion 808, and is connected to elongate strip 110. First and second portions 805 and 807 are engageable with each other to form sidewall 126. In some embodiments, first and second portions

805 and 807 are also separable from each other to separate elongate strip 110 from elongate strip 114.

During fabrication, first portions 801 and 805 are secured to elongate strip 114 and second portions 803 and 807 are secured to elongate strip 110. In some embodiments, first and second portions 801, 805, 803, and 807 are formed using an extrusion process, which forms the first and second portions 801, 805, 803, and 807 onto the respective elongate strips 114 and 110. The first portions 801 and 805 are extruded individually in some embodiments, but are extruded simultaneously in other embodiments. Similarly, the second portions 803 and 807 are extruded individually in some embodiments, but are extruded simultaneously in other embodiments.

Rather than extruding directly onto elongate strips 110 and 114, some embodiments pre-form first and second portions 801, 805, 803, and 807 and are later adhered or fastened to elongate strips 114 and 110. Alternatively, a portion of the pre-made first and second portions is melted in some embodiments and then pressed onto the respective elongate strip 114 or 110.

Once splines 804 are attached to elongate strip 110 and the notch 802 portion of plurality of sidewalls 124 and 126, elongate strips 110 and 114 can be secured together. In one embodiment, a fabricator may press elongate strips 110 and 114 together. In other embodiments, a machine may be used to press elongate strips 110 and 114 together.

In some embodiments, when spline 804 is disconnected from sidewalls 124 and 126, spacer 106 is flexible. Then, once spline 804 is connected to sidewalls 124 and 126, spacer 106 locks in place and becomes substantially rigid. In this way the spacer 106 is easily manipulated into a desired configuration and once there, is connected to lock the spacer 106 in the desired configuration.

Example dimensions of spacer 106 are shown in FIG. 14. In one example, W1 is the overall width of spacer 106 and the distance between sheets 102 and 104. W1 is typically in a range from about 0.1 inches to about 2 inches, and preferably from about 0.3 inches to about 1 inch. In one example, T1 is the overall thickness of spacer 106 from external surface 330 to external surface 340. T1 is typically in a range from about 0.02 inches to about 1 inch, and preferably from about 0.1 inches to about 0.5 inches. T2 is the distance between elongate strip 110 and elongate strip 114, and more specifically the distance from internal surface 332 to interior surface 342. In other words, T2 is the height of sidewalls 124 and 126. T2 is in a range from about 0.02 inches to about 0.5 inches, and preferably from about 0.05 inches to about 0.15 inches. In some embodiments elongate strips 110 and 114 are not linear, such as having an undulating shape described below. Therefore, in some of these embodiments, T2 is an average thickness. G is the thickness of sidewalls 124 and 126. G is typically in a range from about 0.01 inches to about 0.5 inches, and preferably from about 0.1 inches to about 0.3 inches. Other embodiments include other dimensions.

In FIG. 14, sidewalls 124 and 126 are offset from the edges of elongate strips 110 and 114. The offset distance S, is typically in a range from about 0.01 inches to about 0.5 inches, and preferably from about 0.1 inches to about 0.3 inches. Other embodiments, however, include sidewalls 124 and 126 that are flush with or substantially flush with edges of elongate strips 110 and 114.

Some embodiments of spacer 106 include sidewalls 124 and 126 that are divided into first and second portions. As shown in FIG. 14, first portions 801 and 805 have a height M and second portions 803 and 807 have a height N. Height N does not include the height of spline 804, such as shown in FIG. 13. The sum of M and N is equal to height T1.

FIG. 15 shows a side view of the spacer 106 shown in FIG. 11 including a non-continuous sidewall 124, including a plurality of spaced sidewall portions 1502 and 1504. Additional sidewall portions are not visible in FIG. 15. Y is the spacing between adjacent sidewall portions—such as sidewall portion 1502 and sidewall portion 1504. The space Y is typically in a range from about 0.001 inches to about 0.5 inches and preferably from about 0.01 inches to about 0.05 inches. J is the width of sidewall portions 1502 and 1504. The width J is typically in a range from about 0.01 inch to about 1 inch, and preferably from about 0.05 inches to about 0.3 inches.

Figure 16:
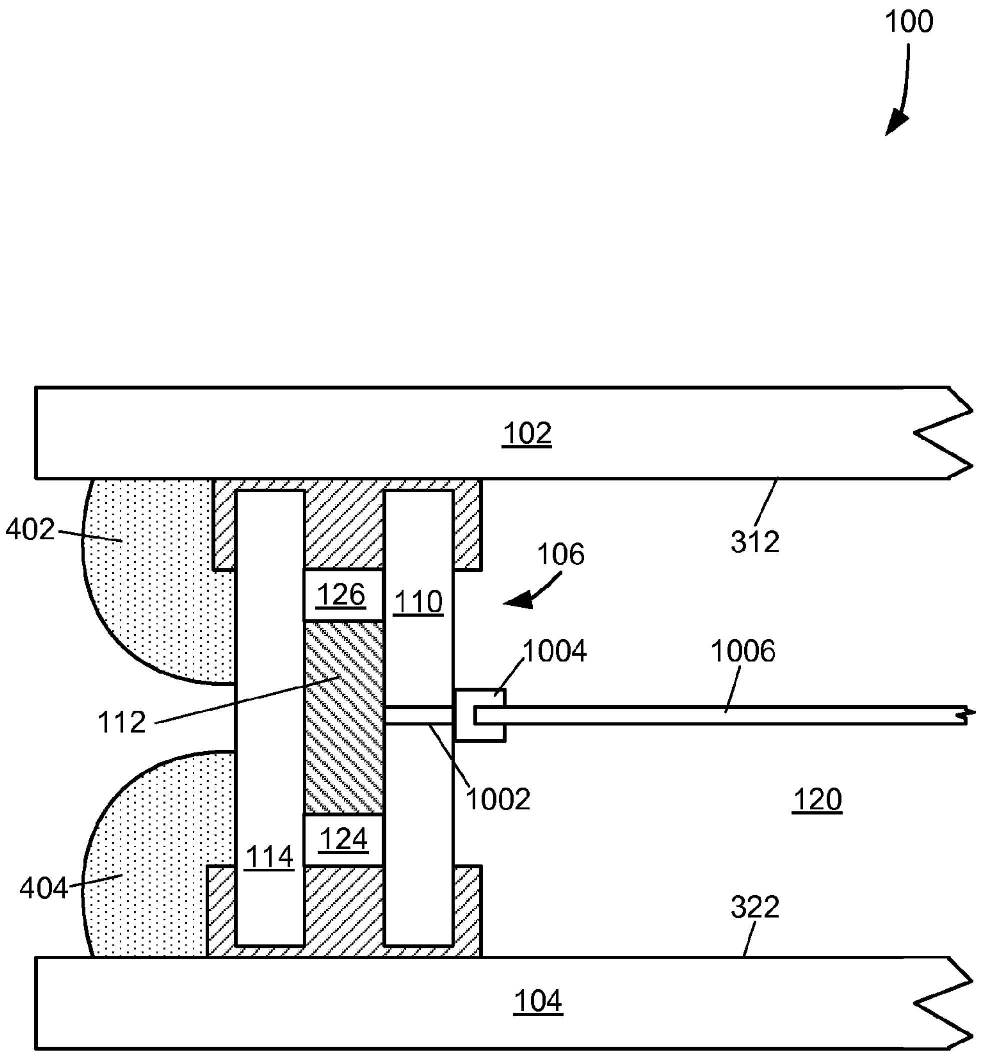
FIG. 16 is a schematic cross-sectional view of another embodiment of a window assembly including an intermediary member.

FIG. 16 is a schematic cross-sectional view of another possible embodiment of window assembly 100. Window assembly 100 includes sheet 102, sheet 104, and an example spacer 106. Spacer 106 includes elongate strip 110, elongate strip 114, sidewalls 124 and 126, first sealant 302 and 304, and second sealant 402 and 404. In this embodiment, spacer 106 further includes fastener aperture 1002, fastener 1004, and intermediate member 1006. In some embodiments spacer 106 includes filler 112.

Some embodiments include an intermediary member 106 that is connected to spacer 106. In one embodiment, intermediary member 1006 is a sheet of glass or plastic, that are included to form a triple-paned window. In another embodiment, intermediary member is a film or plate. For example, intermediary member 1006 is a film or plate of material that absorbs at least some of the sun's ultraviolet radiation as it passes through the window 100, thereby warming interior space 120. In another embodiment, intermediary member 1006 reflects ultraviolet radiation, thereby cooling interior space 120 and preventing some or all of the ultraviolet radiation from passing through the window. In some embodiments, intermediary member 1006 divides interior space into two or more regions. Intermediary member 1006 is a Mylar film in some embodiments. In another embodiment, intermediary member 1006 is a muntin bar. Intermediary member 1006 acts, in some embodiments, to provide additional support to spacer 106. A benefit of some embodiments is that the addition of intermediary member 1006 does not require additional spacers 106 or sealants.

Connection of intermediary member 1006 to spacer 106 can be accomplished in various ways. One way is to punch or cut apertures 1002 in elongate strip 110 of spacer 106 at the desired location(s). In some embodiments, apertures 1002 are arranged as slots and the like. A fastener 1002 is then inserted into the aperture and connected to elongate strip 110. One example of a fastener is a screw. Another example is a pin. Apertures 1002 are not required in all embodiments. In some embodiments, fastener 1004 is an adhesive that does not require apertures 1002. Other embodiments include a fastener 1004 and an adhesive. Some fasteners 1004 are also arranged to connect with an intermediary member 1006, to connect the intermediary member 1006 to spacer 106. An example of fastener 1004 is a muntin bar clip.

Figure 17:
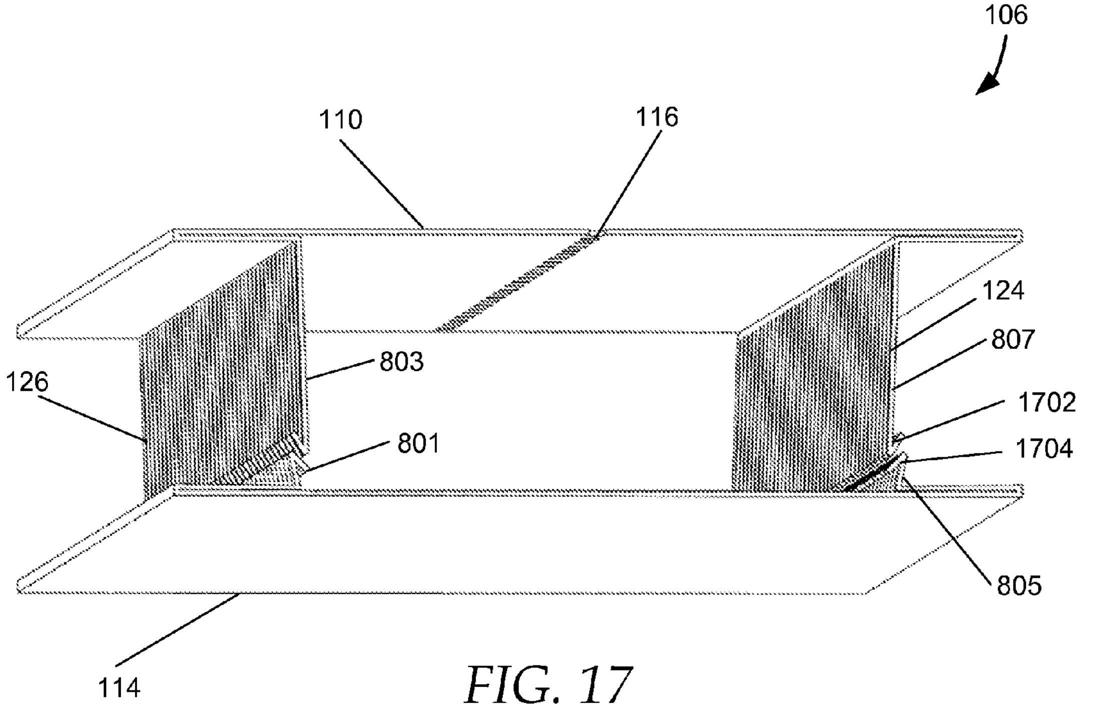
FIG. 17 is an exploded assembly perspective schematic of a spacer.
Figure 18:
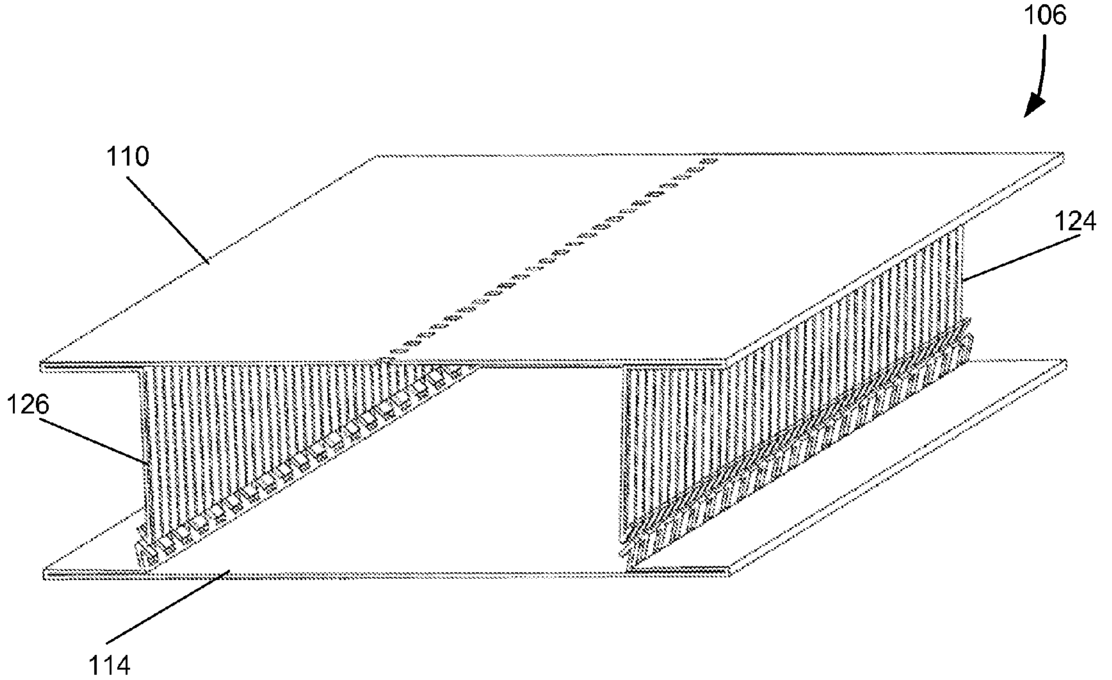
FIG. 18 is an exploded assembly perspective schematic of a spacer.
Figure 19:
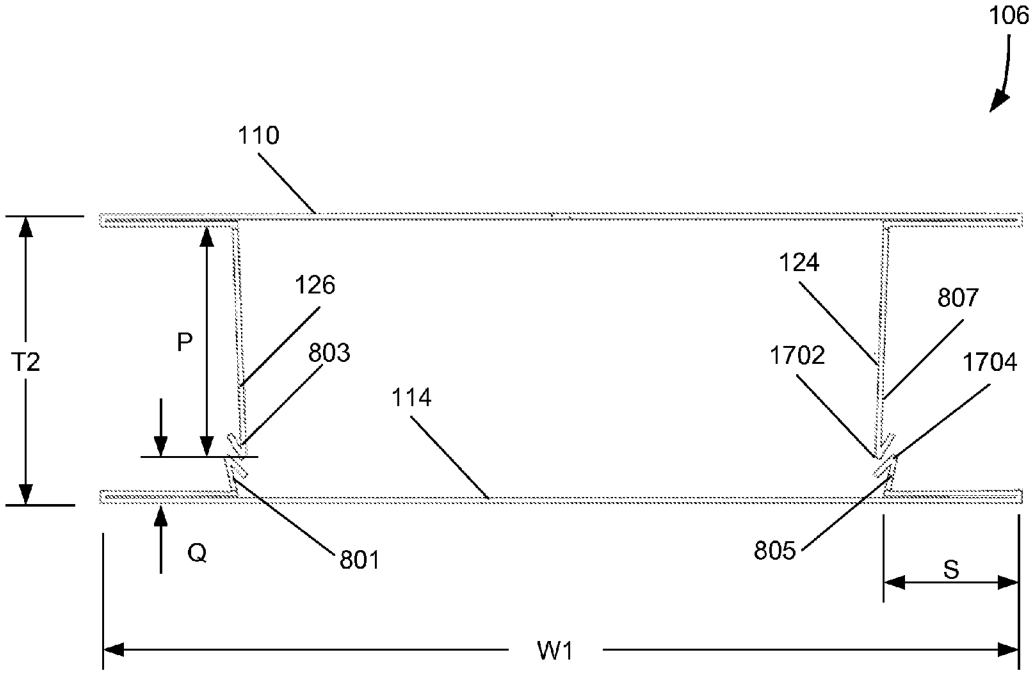
FIG. 19 is a schematic cross-sectional view of a portion of the spacer shown in FIGS. 17 and 18.
Figure 20:
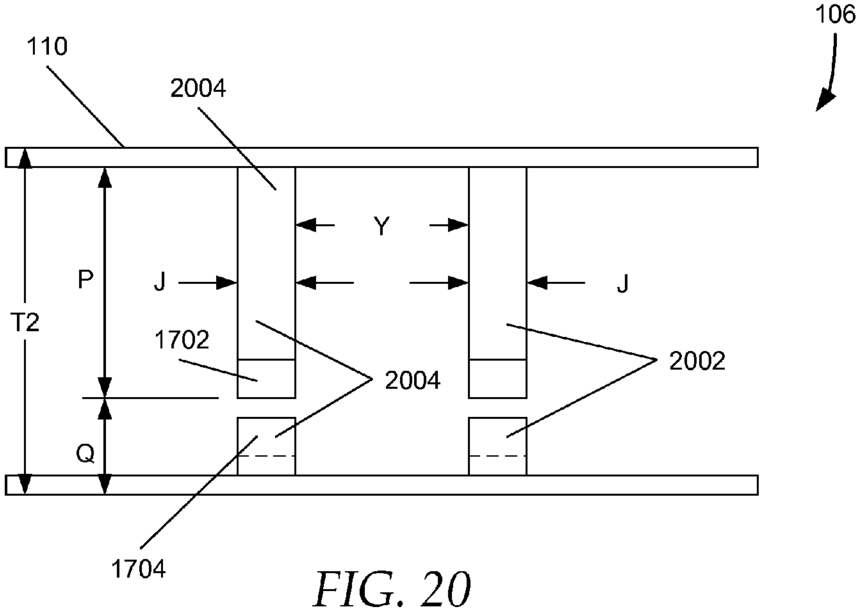
FIG. 20 is a side view of a portion of the spacer shown in FIGS. 17 and 18.

FIGS. 17-20 illustrate another example embodiment of spacer 106. FIG. 17 is a perspective view of the example spacer 106 arranged in an unassembled configuration. FIG. 18 is another perspective view of the example spacer 106 shown in FIG. 17 arranged in an unassembled configuration. FIG. 19 is a cross-sectional view of the example spacer 106 shown in FIG. 17 arranged in an unassembled configuration. FIG. 20 is a side view of the example spacer 106 shown in FIG. 17 arranged in an unassembled configuration.

Spacer 106 includes elongate strips 110 and 114 and sidewalls 124 and 126. In some embodiments, elongate strip 110 includes apertures 116, such as to allow moisture to pass through elongate strip 110. In this embodiment, spacer 106 includes non-continuous sidewalls sidewalls 124 and 126, including a plurality of sidewall portions. Sidewalls 124 and 126 provide a uniform or substantially uniform spacing between elongate strips 110 and 114.

In this example, each portion of sidewalls 124 and 126 includes a fastening mechanism including a pair of hooks 1702 and 1704. Hooks 1702 and 1704 are configured such that hook 1702 is engagable with hook 1704. When disengaged, first portions 801 and 805 are separable from second portions 803 and 807. Hooks 1702 and 1704 are configured to be engageable by arranging first and second portions 801 and 803 and first and second portions 805 and 807 as shown in FIG. 17, and then pressing them together (such as by applying a force to elongate strips 110 and 114) to cause hooks 1702 and 1704 to latch together. In some embodiments the latching of hooks 1702 and 1704 is performed using a zipper mechanism. Similarly, a zipper mechanism can also be used to disengage hooks 1702 and 1704 in some embodiments.

FIG. 19 is a cross-sectional view of the spacer 106 shown in FIG. 17. In FIG. 19 sidewalls 124 and 126 are offset from the edges of elongate sheets 110 and 114, having an offset distance S. In other embodiments, sidewalls 124 and 126 are flush with the edges of elongate strips 110 and 114. Q is the height of first portions 801 and 805. P is the height of second portions 803 and 807.

FIG. 20 is a side view of example spacer 106 shown in FIG. 17. Spacer 106 includes sidewall portion 2002 and sidewall portion 2004. Additional side wall portions are not visible in FIG. 20. Y is the distance of a space between adjacent sidewall portions 2002 and 2004. J is the width of sidewall portions 2002 and 2004. Examples of Y and J are discussed herein. Note that while FIGS. 17-20 show sidewalls 124 and 126 as being segmented into a plurality of sidewall portions, some embodiments include continuous sidewalls. In other words, in some embodiments, Y is equal to zero.

Elongate strips 110 and 114 can be fabricated from various materials including, but not limited to, metals, plastics, and ceramics. In addition, elongate strips 110 and 114 can be fabricated via various methods including, but not limited to, roll forming, extrusion, molding, stamping, or a combination of these.

Figure 21:
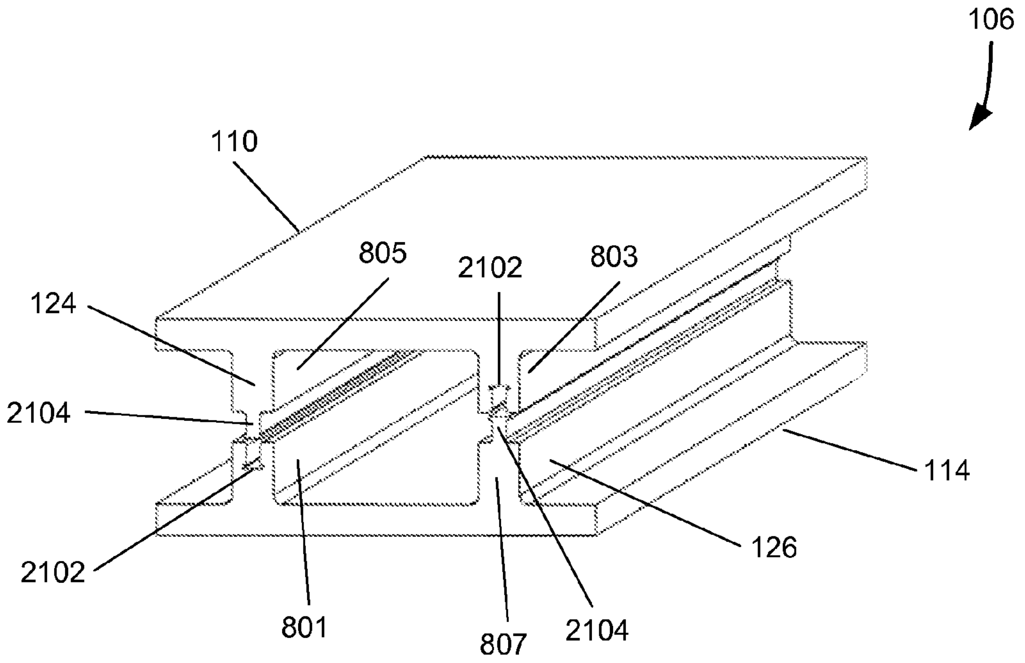
FIG. 21 is an exploded assembly perspective schematic of a spacer.
Figure 22:
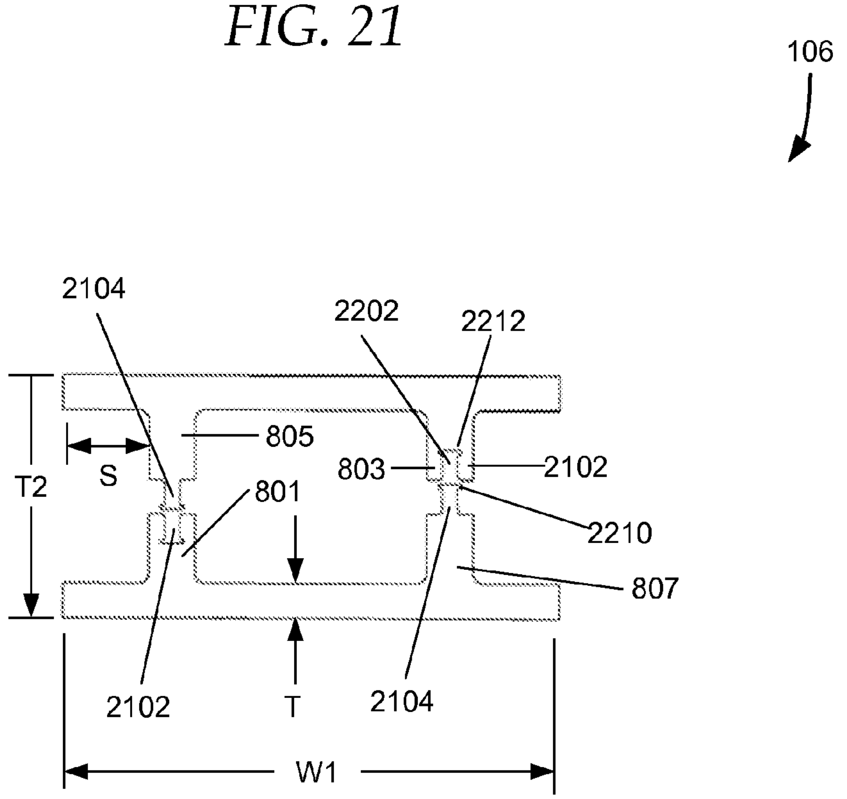
FIG. 22 is a schematic cross-sectional view of a portion of the spacer shown in FIG. 21.

FIGS. 21-22 illustrate another example embodiment of spacer 106. FIG. 21 is a schematic perspective view of the example spacer 106. FIG. 22 is a schematic cross-sectional view of the example spacer shown in FIG. 21. As discussed above, spacer 106 includes elongate strips 110, elongate strip 114, sidewall 124, and sidewall 126. Sidewalls 124 and 126 include first portions 801 and 803 and second portions 805 and 807.

In this embodiment, elongate strip 110, first potion 803, and second portion 805 form a continuous piece. Elongate strip 114, first portion 801, and second portion 807 also form a continuous piece. In other embodiments, elongate strips 110 and 114 are formed separately from sidewalls 124 and 126. For example, elongate strips 110 and 114 are first formed, such as by bending long and thin ribbons of material into an undulating shape. Sidewalls 110 and 114 are then formed by extruding the sidewalls onto the elongate strips 110 and 114. Alternatively, a fastener is used, such as adhesive, to connect sidewalls 124 and 126 to elongate strips 110 and 114.

First portions 801 and 803 of sidewalls 124 and 126 include a recessed region 2102 at an end. Second portions 805 and 807 include a protrusion 2104. Protrusions 2104 are configured to mate with recessed regions 2102 to connect first portions 801 and 803 with second portions 805 and 807.

As described above, sidewalls 124 and 126 are located along the edges of elongate strips 110 and 114 in some embodiments, and are offset by a distance S from the edges of elongate strips in other embodiments. In addition, spacer 106 shown in FIGS. 21 and 22 may have dimensions W1, T, T2, and G similar to those describe above with regard to FIG. 14. Other embodiments include other dimensions.

In some embodiments, as shown in FIGS. 21 and 22, first portions 2102 of elongate strips 110 and 114 include recessed regions 2102 in the form of grooves. Second portions 2104 of elongate strips 110 and 114 include protrusions 2104 in the form of tongues 2106. Recessed regions 2102 are formed such that they snap together with protrusions 2104 to form an assembled spacer 106. In some embodiments recessed regions 2102 have a slightly smaller width than protrusions 2104 such that when protrusions 2104 are pressed into recesses 2102, friction holds the pieces together. In other embodiments, protrusions 2206 and 2208 have prongs 2210 (shown in FIG. 22) that engage receiver 2212 to hold elongate strips 110 and 114 together.

In some embodiments a zipper mechanism is used to connect first portion 2102 with second portion 2104. In some embodiments the zipper is also used to disconnect first portion 2102 from second portion 2104.

Elongate strips 110 and 114 are fabricated from possible materials including, but not limited to, metals, plastics, and ceramics. In addition, elongate strips 110 and 114 are fabricated via various possible methods including, but not limited to, casting, and extrusion.

Figure 23:
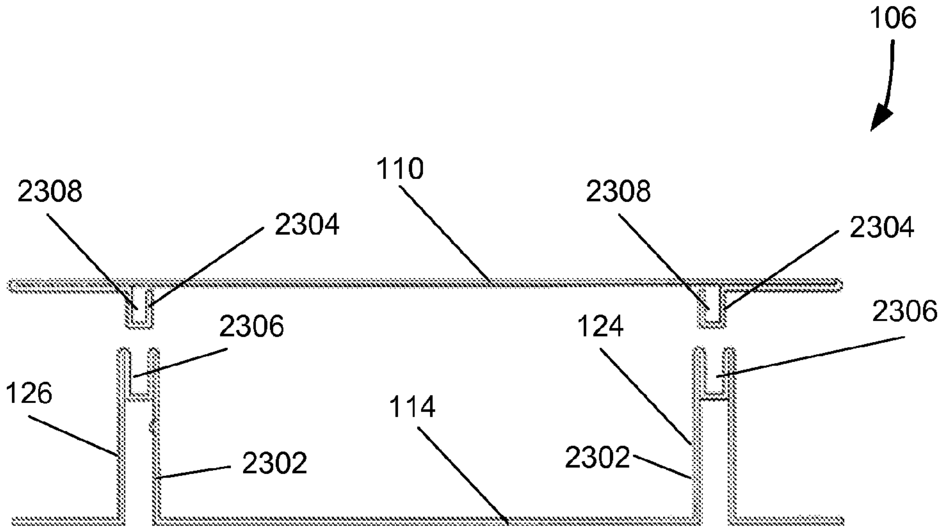
FIG. 23 is a schematic cross-sectional view of a spacer.

FIG. 23 illustrates another example embodiment of spacer 106. FIG. 23 is a cross-sectional view of spacer 106 including elongate strip 110, elongate strip 114, sidewall 124, and sidewall 126. Sidewalls 124 and 126 include first portions 2302 and second portions 2304. sidewalls 124 and 126.

First portions 2302 of sidewalls 124 and 126 include recessed portions 2306. Second portions 2304 of sidewalls 124 and 126 include protrusions 2308. In this example, recessed portions 2306 are in the form of grooves. Protrusions 2308 are in the form of tongues. Protrusions 2308 are configured to mate with recessed portions 2306. Some embodiments are configured to snap together. Once connected, spacer 106 remains connected due to friction or an additional fastener, such as adhesive or sealant.

In this embodiment, elongate strip 110 and second portions 2304 are formed of a continuous piece of material. Similarly, elongate strip 114 and first portions 2302 are formed of a continuous piece of material. In some embodiments spacer 106 is formed of long and thin ribbons of material that are bent, such as by roll forming, into the configuration shown. Other embodiments are made by processes such as extrusion or casting.

Figure 24:
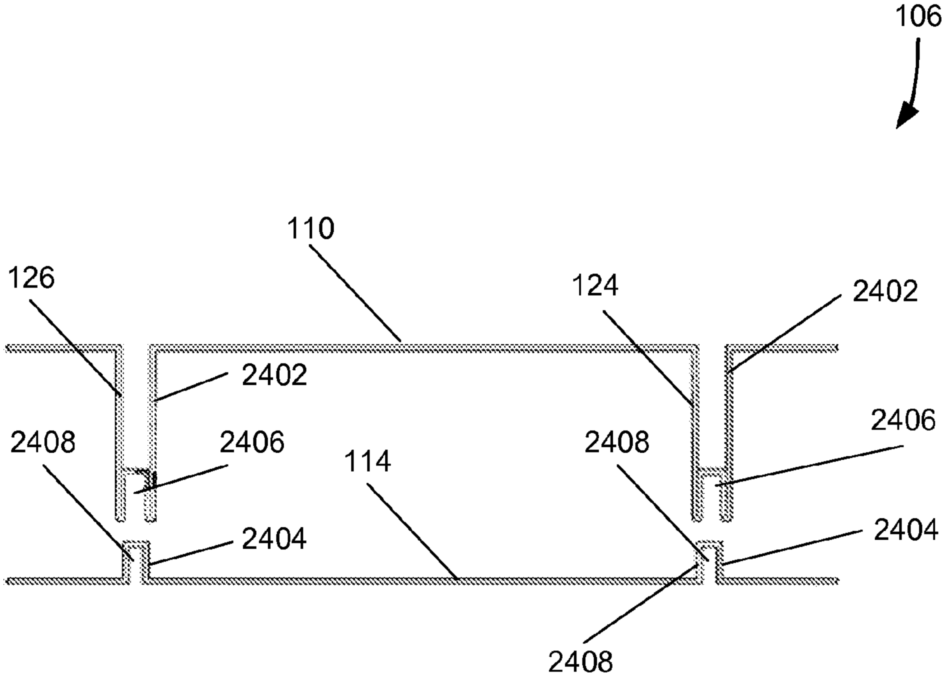
FIG. 24 is a schematic cross-sectional view of a spacer.

FIG. 24 illustrates another embodiment of an example spacer 106. FIG. 24 is a cross-sectional view of spacer 106 including elongate strip 110, elongate strip 114, sidewall 124, and sidewall 126. Sidewalls 124 and 126 include first portions 2402 and second portions 2404.

First portions 2402 of sidewalls 124 and 126 include recessed portions 2406. Second portions 2404 of sidewalls 124 and 126 include protrusions 2408. In this example, recessed portions 2406 are in the form of grooves that extend longitudinally along an end of first portions 2402. Protrusions 2408 are in the form of tongues that extend longitudinally along second portions 2404. Protrusions 2408 are configured to mate with recessed portions 2406. Some embodiments are configured to snap together. Once connected, spacer 106 remains connected due to friction. In another embodiment an additional fastener, such as adhesive or sealant, is used to connect first and second portions of spacer 106.

In this embodiment, elongate strip 110 and first portions 2402 are formed of a continuous piece of material. Similarly, elongate strip 114 and second portions 2302 are formed of a continuous piece of material. In some embodiments spacer 106 is formed of long and thin ribbons of material that are bent, such as by roll forming, into the configuration shown. Other embodiments are made by processes such as extrusion or casting.

Figure 25:
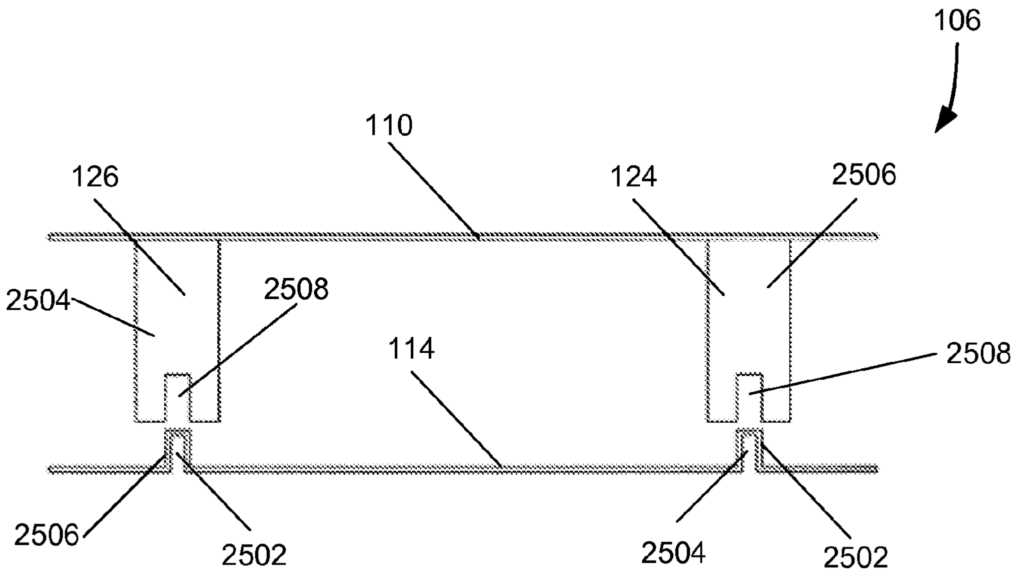
FIG. 25 is a schematic cross-sectional view of a spacer.

FIG. 25 is a cross-sectional view of another example spacer 106 including elongate strip 110, elongate strip 114, sidewall 124, and sidewall 126. In this embodiment, sidewalls 124 and 126 include first portions 2502 and second portions 2504. First portion 2502 includes recessed region 2506. Second portion 2504 includes recessed region 2508. In some embodiments recessed region 2508 is in the form of a groove. In some embodiments protrusion 2506 is in the form of a tongue. Other embodiments include a plurality of grooves and a plurality of tongues. Other possible embodiments include a plurality of teeth and a plurality of spaced recesses configured to receive the teeth therein.

Elongate strips 110 and 114 may be made from materials including, but not limited to, metals and plastics. In addition, elongate strips 110 and 114 may be manufactured via methods including, but not limited to, rolling, bending, and extrusion. First portions 2502 including protrusions 2506 are formed directly into elongate strip 114 in some embodiments. Second portions 2504 are made by, for example, extruding a material onto elongate strip 110. Recessed region 2508 is formed in some embodiments through the extrusion process. In other embodiments, recessed region 2508 is formed by cutting, drilling, routing, or grinding a groove into a face at an end of second portion 2504. Second portion 2504 is made of a material such as metal, plastic, ceramics, or combinations of these materials. In some embodiments first portion 2504 is bonded to elongate sheet 110 by one or more fastening methods, such as thermal bonding, ultrasonic welding, adhesive, or use of another fastener.

Figure 26:
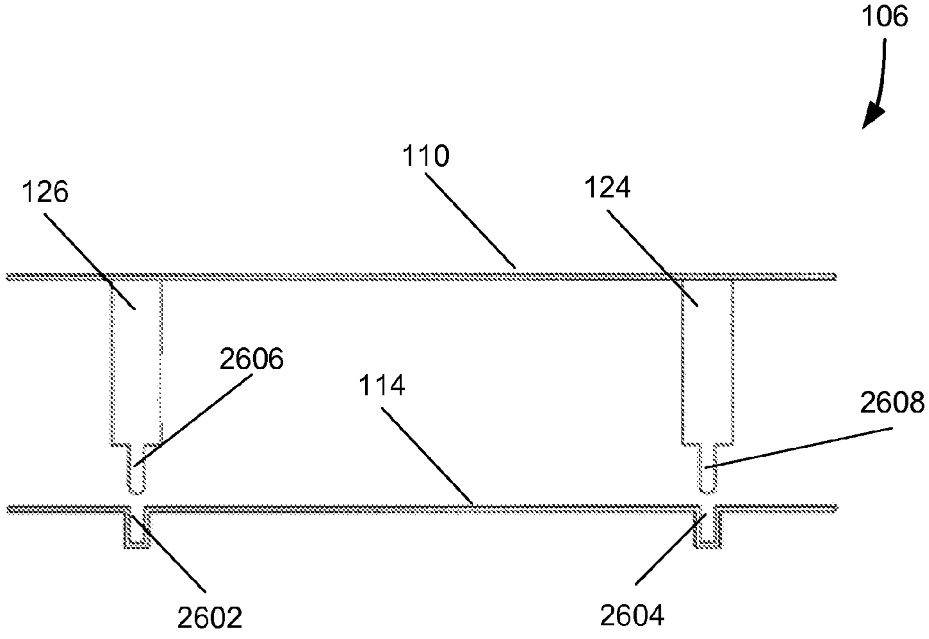
FIG. 26 is a schematic cross-sectional view of a spacer.
Figure 27:
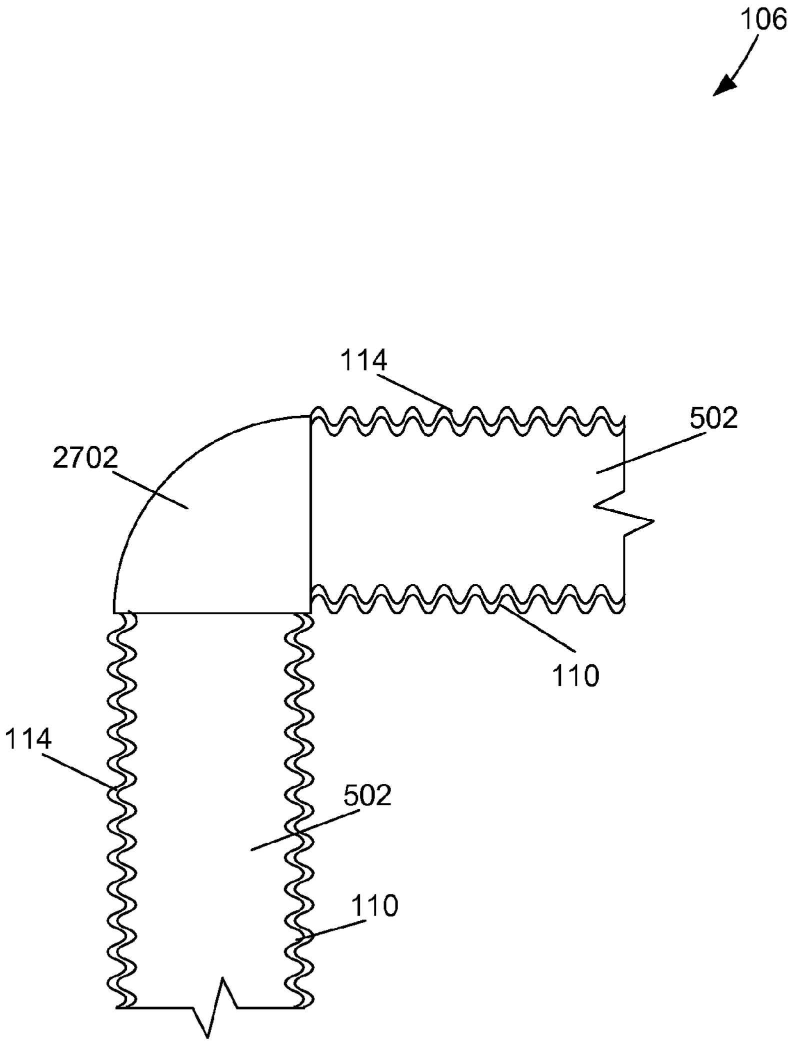
FIG. 27 is a schematic front view of a portion of the spacer shown in FIG. 4 arranged in a corner configuration.

FIG. 26 is a cross-sectional view of another example spacer 106 including elongate strip 110, elongate strip 114, sidewall 124, and sidewall 126. In this embodiment, elongate strip 114 includes recessed regions 2602 in the form of parallel grooves. Sidewalls 124 and 126 include protrusions 2604 extending out from the ends of the sidewalls 124 and 126. In this embodiment protrusions 2604 are in the form of tongues. The protrusions 2604 are configured to engage with recessed regions 2602. FIG. 27 is a front view of an example spacer 106 and an example corner key 2702. Some embodiments of spacer 106 are not flexible. In such embodiments, the spacer 106 may be connected to a corner fastener, such as a corner key 2702.

Spacer 106 includes elongate strip 110, sidewall 502, and elongate strip 114. In this embodiment, elongate strips 110 and 114 have an undulating shape. As shown, a corner key 2702 is used to form the corner. Some embodiments of spacer 106 can be arranged to form a corner without corner key 2702. In these embodiments, sidewall 502 is made from a material that is able to bend and flex without kinking or breaking.

Elongate strips 110 and 114 include an undulating shape. As a result, elongate strips 110 and 114 are arranged to expand and compress as necessary. In embodiments employing continuous sidewalls 124 and 126, to achieve the bending flexibility needed to form curves, continuous sidewalls 124 and 126 may be constructed of a flexible material that allows spacer 106 to be bent. In other embodiments employing continuous sidewalls 124 and 126, the material used to fabricate continuous sidewalls 124 and 126 may be heated to soften the material thereby making in pliable. In still other embodiments employing continuous sidewalls 124 and 126, the curves may be formed while the material is in a pliable form. The material may then be allowed to set and/or cure such that a ridge or semi flexible corner is formed. In still yet other embodiments employing continuous sidewalls 124 and 126, the curves may be formed by cutting continuous strips of spacer 106 to form the corners. For instance, a continuous strip of spacer 106 may be cut along 45° angles to form a mitered corners.

In embodiments employing plurality of sidewalls 124 and 126, to achieve the bending flexibility needed to form corners, portions of plurality of sidewalls 124 and 126 may be removed to form a corner. For instance, in FIG. 11, portions of sidewall 124 (124*a*, 124*b*, and 124*b*) and sidewall 126 (removed portions not shown) may be removed from elongate strip 114. With portions 124*a*, 124*b*, and 124*c* removed elongate strip 114 can be bent to form a corner. Once elongate strip 114 is bent elongate strip 110 may be secured via spline 804. In an embodiment, spline 804 may have protuberances that contact notch 802 such that spline 804 does not move within notch 802 thereby forming a ridged corner. In other embodiments, spline 804 may be allowed to move within notch 802 such that spacer 106 may be bent to form a corner or other non-liner shape.

Although the present disclosure refers to window assemblies and window spacers, some embodiments are used for other purposes. For example, another possible embodiment according to the present disclosure is a spacer for a sealed unit.

The various embodiments described above are provided by way of illustration only and should not be construed to limit the claims attached hereto. Those skilled in the art will readily recognize various modifications and changes that may be made without following the example embodiments and applications illustrated and described herein, and without departing from the intended scope of the following claims.

What is claimed is:

1. A method of making a spacer, the method comprising:

arranging at least a portion of a first elongate strip and at least a portion of a second elongate strip to define a space there between;

extruding a first sidewall through a first extrusion nozzle and an extrusion die in the space, wherein the extrusion die is positioned between the elongate strips and configured such that the first sidewall is offset from the elongate edges of the first elongate strip and the second elongate strip;

adhering the first sidewall to the first elongate strip and the second elongate strip;

moving the first extrusion nozzle relative to the first and second elongate strips while extruding the first sidewall; and passing the first elongate strip and the second elongate strip through a guide, wherein extruding the first sidewall and adhering the first sidewall is while the first elongate strip and the second elongate strip pass through the guide.

2. The method of claim 1, wherein the first sidewall comprises plastic.

3. The method of claim 1, further comprising extruding a second sidewall through a second extrusion nozzle in the space;

adhering the second sidewall to the first elongate strip and the second elongate strip; and moving the second extrusion nozzle relative to the first and second elongate strips while extruding the second sidewall.

4. The method of claim 3, wherein extruding the first sidewall and extruding the second sidewall occur substantially simultaneously.

5. The method of claim 3, wherein extruding the first sidewall and extruding the second sidewall occur in separate steps.

6. The method of claim 1, further comprising guiding the first extrusion nozzle along the space defined between the first elongate strip and the second elongate strip while extruding the first sidewall.

7. A method of making a spacer, the method comprising:

bending a first ribbon into an undulating shape to form the first elongate strip;

bending a second ribbon into an undulating shape to form the second elongate strip;

arranging at least a portion of a first elongate strip and a second elongate strip in a spaced relationship, wherein the first elongate strip has a first surface and the second elongate strip has a second surface that is facing the first surface; and extruding a first sidewall through a first extrusion nozzle and an extrusion die to be in contact with the first surface and the second surface, wherein the extrusion die is positioned between the elongate strips and configured such that the first sidewall is offset from the elongate edges of the first elongate strip and the second elongate strip.

8. A method of making a spacer, the method comprising:

arranging at least a portion of a first elongate strip and a second elongate strip in a spaced relationship, the first elongate strip including a first surface and the second elongate strip including a second surface;

extruding a first sidewall through a first extrusion nozzle;

moving the first extrusion nozzle relative to the first and second elongate strips while extruding through an extrusion die to apply the first sidewall to the first surface of the first elongate strip and to the second surface of the second elongate strip to connect the first and second elongate strips, wherein the extrusion die is positioned between the elongate strips and configured such that the first sidewall is offset from the elongate edges of the first elongate strip and the second elongate strip; and passing the first elongate strip and the second elongate strip through a guide; and extruding the first sidewall as the first elongate strip and the second elongate strip pass through the guide.

9. The method of claim 8, wherein the first sidewall comprises plastic.

10. The method of claim 8, further comprising extruding a second sidewall through a second extrusion nozzle; and moving the second extrusion nozzle relative to the first and second elongate strips while extruding to apply the second sidewall to the first surface of the first elongate strip and to the second surface of the second elongate strip to connect the first and second elongate strips, wherein the first sidewall is separated from the second sidewall by a distance.

11. The method of claim 10, wherein extruding the first sidewall and extruding the second sidewall occurs substantially simultaneously.

12. The method of claim 10, wherein extruding the first sidewall and extruding the second sidewall occurs in separate steps.

* * * * *